US012625240B2

(12) United States Patent
Li et al.

(10) Patent No.: US 12,625,240 B2
(45) Date of Patent: May 12, 2026

(54) SYSTEMS AND METHODS FOR TUNING FILTERS FOR USE IN LIDAR SYSTEMS

(71) Applicant: Innovusion, Inc., Sunnyvale, CA (US)

(72) Inventors: Yimin Li, Cupertino, CA (US); Rui Zhang, Palo Alto, CA (US); Junwei Bao, Los Altos, CA (US)

(73) Assignee: SEYOND, INC., Sunnyvale, CA (US)

( * ) Notice: Subject to any disclaimer, the term of this patent is extended or adjusted under 35 U.S.C. 154(b) by 213 days.

(21) Appl. No.: 18/220,152

(22) Filed: Jul. 10, 2023

(65) Prior Publication Data

US 2023/0358870 A1     Nov. 9, 2023

Related U.S. Application Data

(63) Continuation-in-part of application No. 16/546,724, filed on Aug. 21, 2019, now Pat. No. 11,796,645.
(Continued)

(51) Int. Cl.
G01S 7/497     (2006.01)
G01S 7/481     (2006.01)
G01S 17/931    (2020.01)

(52) U.S. Cl.
CPC ............. G01S 7/497 (2013.01); G01S 7/4816 (2013.01); G01S 17/931 (2020.01)

(58) Field of Classification Search
CPC ........ G01S 7/497; G01S 17/931; G01S 7/484; G01S 7/481; G02B 5/28; G02B 5/3016
See application file for complete search history.

(56) References Cited

U.S. PATENT DOCUMENTS 3,897,150 A     7/1975  Bridges et al.
4,464,048 A     8/1984  Farlow
(Continued)

FOREIGN PATENT DOCUMENTS

CN          1677050 A     10/2005
CN        204758260 U     11/2015
(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
(Continued)

*Primary Examiner* — Jamil Ahmed
(74) *Attorney, Agent, or Firm* — MASCHOFF BRENNAN; Yujie Xiong; Liang Huang

(57)     ABSTRACT
A LiDAR system comprising one or more tunable filters is provided. The one or more tunable filters can be tuned to compensate for wavelength shifts of light signals caused by ambient environmental changes. The LiDAR system includes a light source providing light signals, a signal steering system configured to direct the light signals to a field-of-view, and temperature monitoring circuitry configured to monitor a temperature shift of the light source. The temperature shift corresponds to a wavelength shift of the light signals from a first wavelength value to a second wavelength value. The system further comprises a tunable filter positioned in a receiving system configured to receive return light signals, and a motor configured to rotate the tunable filter by an angle based on the temperature shift such that a passband of the tunable filter matches the second wavelength value.

27 Claims, 19 Drawing Sheets

Related U.S. Application Data

(60) Provisional application No. 62/722,498, filed on Aug. 24, 2018.

(56) References Cited

U.S. PATENT DOCUMENTS

| | | | |
|---|---|---|---|
| 5,006,721 A | 4/1991 | Cameron et al. | |
| 5,157,451 A | 10/1992 | Taboada et al. | |
| 5,283,845 A | 2/1994 | Ip | |
| 5,319,434 A | 6/1994 | Croteau et al. | |
| 5,369,661 A | 11/1994 | Yamaguchi et al. | |
| 5,442,358 A | 8/1995 | Keeler et al. | |
| 5,546,188 A | 8/1996 | Wangler et al. | |
| 5,579,153 A | 11/1996 | Laming et al. | |
| 5,657,077 A | 8/1997 | DeAngelis et al. | |
| 5,793,491 A | 8/1998 | Wangler et al. | |
| 5,838,239 A | 11/1998 | Stern et al. | |
| 5,864,391 A | 1/1999 | Hosokawa et al. | |
| 5,926,259 A | 7/1999 | Bamberger et al. | |
| 5,936,756 A | 8/1999 | Nakajima | |
| 6,163,378 A | 12/2000 | Khoury | |
| 6,317,202 B1 | 11/2001 | Hosokawa et al. | |
| 6,594,000 B2 | 7/2003 | Green et al. | |
| 6,650,404 B1 | 11/2003 | Crawford | |
| 6,950,733 B2 | 9/2005 | Stopczynski | |
| 7,128,267 B2 | 10/2006 | Reichenbach et al. | |
| 7,202,941 B2 | 4/2007 | Munro | |
| 7,345,271 B2 | 3/2008 | Boehlau et al. | |
| 7,440,084 B2 | 10/2008 | Kane | |
| 7,440,175 B2 | 10/2008 | Di Teodoro et al. | |
| 7,489,865 B2 | 2/2009 | Varshneya et al. | |
| 7,576,837 B2 | 8/2009 | Liu et al. | |
| 7,830,527 B2 | 11/2010 | Chen | |
| 7,835,068 B1 | 11/2010 | Brooks et al. | |
| 7,847,235 B2 | 12/2010 | Krupkin et al. | |
| 7,880,865 B2 | 2/2011 | Tanaka et al. | |
| 7,936,448 B2 | 5/2011 | Albuquerque et al. | |
| 7,969,558 B2 | 6/2011 | Hall | |
| 7,982,861 B2 | 7/2011 | Abshire et al. | |
| 8,072,582 B2 | 12/2011 | Meneely | |
| 8,471,895 B2 | 6/2013 | Banks | |
| 8,736,818 B2 | 5/2014 | Weimer et al. | |
| 8,749,764 B2 | 6/2014 | Hsu et al. | |
| 8,812,149 B2 | 8/2014 | Doak | |
| 8,984,928 B2 | 3/2015 | Shiraishi | |
| 9,046,616 B2 | 6/2015 | Robinson | |
| 9,065,243 B2 | 6/2015 | Asobe et al. | |
| 9,086,273 B1 | 7/2015 | Gruver et al. | |
| 9,194,701 B2 | 11/2015 | Bosch | |
| 9,255,790 B2 | 2/2016 | Zhu | |
| 9,300,321 B2 | 3/2016 | Zalik et al. | |
| 9,304,316 B2 | 4/2016 | Weiss et al. | |
| 9,316,724 B2 | 4/2016 | Gehring et al. | |
| 9,354,485 B2 | 5/2016 | Fermann et al. | |
| 9,510,505 B2 | 12/2016 | Halloran et al. | |
| 9,575,184 B2 | 2/2017 | Gilliland et al. | |
| 9,605,998 B2 | 3/2017 | Nozawa | |
| 9,621,876 B2 | 4/2017 | Federspiel | |
| 9,638,799 B2 | 5/2017 | Goodwin et al. | |
| 9,696,426 B2 | 7/2017 | Zuk et al. | |
| 9,702,966 B2 | 7/2017 | Batcheller et al. | |
| 9,804,264 B2 | 10/2017 | Villeneuve et al. | |
| 9,810,786 B1 | 11/2017 | Welford et al. | |
| 9,812,838 B2 | 11/2017 | Villeneuve et al. | |
| 9,823,353 B2 | 11/2017 | Eichenholz et al. | |
| 9,857,468 B1 | 1/2018 | Eichenholz et al. | |
| 9,869,754 B1 | 1/2018 | Campbell et al. | |
| 9,880,263 B2 | 1/2018 | Droz et al. | |
| 9,880,278 B2 | 1/2018 | van Uffelen et al. | |
| 9,885,778 B2 | 2/2018 | Dussan | |
| 9,897,689 B2 | 2/2018 | Dussan | |
| 9,915,726 B2 | 3/2018 | Bailey et al. | |
| 9,927,915 B2 | 3/2018 | Frame et al. | |
| 9,958,545 B2 | 5/2018 | Eichenholz et al. | |
| 10,007,001 B1 | 6/2018 | LaChapelle et al. | |
| 10,012,732 B2 | 7/2018 | Eichenholz et al. | |
| 10,042,159 B2 | 8/2018 | Dussan et al. | |
| 10,061,019 B1 | 8/2018 | Campbell et al. | |
| 10,073,166 B2 | 9/2018 | Dussan | |
| 10,078,133 B2 | 9/2018 | Dussan | |
| 10,094,925 B1 | 10/2018 | LaChapelle | |
| 10,157,630 B2 | 12/2018 | Vaughn et al. | |
| 10,191,155 B2 | 1/2019 | Curatu | |
| 10,215,847 B2 | 2/2019 | Scheim et al. | |
| 10,267,898 B2 | 4/2019 | Campbell et al. | |
| 10,295,656 B1 | 5/2019 | Li et al. | |
| 10,310,058 B1 | 6/2019 | Campbell et al. | |
| 10,324,170 B1 | 6/2019 | Engberg, Jr. et al. | |
| 10,324,185 B2 | 6/2019 | McWhirter et al. | |
| 10,393,877 B2 | 8/2019 | Hall et al. | |
| 10,429,495 B1 | 10/2019 | Wang et al. | |
| 10,444,356 B2 | 10/2019 | Wu et al. | |
| 10,451,716 B2 | 10/2019 | Hughes et al. | |
| 10,466,342 B1 | 11/2019 | Zhu et al. | |
| 10,502,831 B2 | 12/2019 | Eichenholz | |
| 10,509,112 B1 | 12/2019 | Pan | |
| 10,520,602 B2 | 12/2019 | Villeneuve et al. | |
| 10,557,923 B2 | 2/2020 | Watnik et al. | |
| 10,571,567 B2 | 2/2020 | Campbell et al. | |
| 10,578,720 B2 | 3/2020 | Hughes et al. | |
| 10,591,600 B2 | 3/2020 | Villeneuve et al. | |
| 10,627,491 B2 | 4/2020 | Hall et al. | |
| 10,641,872 B2 | 5/2020 | Dussan et al. | |
| 10,663,564 B2 | 5/2020 | LaChapelle | |
| 10,663,585 B2 | 5/2020 | McWhirter | |
| 10,663,596 B2 | 5/2020 | Dussan et al. | |
| 10,684,360 B2 | 6/2020 | Campbell | |
| 10,908,262 B2 | 2/2021 | Dussan | |
| 10,908,265 B2 | 2/2021 | Dussan | |
| 10,908,268 B2 | 2/2021 | Zhou et al. | |
| 10,969,475 B2 | 4/2021 | Li et al. | |
| 10,983,218 B2 | 4/2021 | Hall et al. | |
| 11,002,835 B2 | 5/2021 | Pan et al. | |
| 11,009,605 B2 | 5/2021 | Li et al. | |
| 11,175,405 B2 | 11/2021 | Pacala et al. | |
| 11,178,381 B2 | 11/2021 | Pacala et al. | |
| 11,194,048 B1 | 12/2021 | Burbank et al. | |
| 11,287,515 B2 | 3/2022 | Pacala et al. | |
| 11,422,236 B2 | 8/2022 | Pacala et al. | |
| 2002/0060784 A1* | 5/2002 | Pack | G01S 17/89 356/6 |
| 2002/0063160 A1* | 5/2002 | Krichever | G06K 19/04 235/462.32 |
| 2002/0136251 A1 | 9/2002 | Green et al. | |
| 2003/0034398 A1 | 2/2003 | Krichever et al. | |
| 2004/0135992 A1 | 7/2004 | Munro | |
| 2005/0033497 A1 | 2/2005 | Stopczynski | |
| 2005/0190424 A1 | 9/2005 | Reichenbach et al. | |
| 2005/0195383 A1 | 9/2005 | Breed et al. | |
| 2006/0071846 A1 | 4/2006 | Yanagisawa et al. | |
| 2006/0132752 A1 | 6/2006 | Kane | |
| 2007/0091948 A1 | 4/2007 | Di Teodoro et al. | |
| 2007/0216995 A1 | 9/2007 | Bollond et al. | |
| 2008/0174762 A1 | 7/2008 | Liu et al. | |
| 2008/0193135 A1 | 8/2008 | Du et al. | |
| 2008/0240725 A1* | 10/2008 | Yokoyama | H04B 10/40 398/139 |
| 2009/0010644 A1 | 1/2009 | Varshneya et al. | |
| 2009/0051926 A1 | 2/2009 | Chen | |
| 2009/0059201 A1 | 3/2009 | Willner et al. | |
| 2009/0067453 A1 | 3/2009 | Mizuuchi et al. | |
| 2009/0147239 A1 | 6/2009 | Zhu et al. | |
| 2009/0262760 A1 | 10/2009 | Krupkin et al. | |
| 2009/0316134 A1 | 12/2009 | Michael et al. | |
| 2010/0006760 A1 | 1/2010 | Lee et al. | |
| 2010/0020306 A1 | 1/2010 | Hall | |
| 2010/0020377 A1 | 1/2010 | Borchers et al. | |
| 2010/0027602 A1 | 2/2010 | Abshire et al. | |
| 2010/0045965 A1 | 2/2010 | Meneely | |
| 2010/0053715 A1 | 3/2010 | O'Neill et al. | |
| 2010/0128109 A1 | 5/2010 | Banks | |
| 2010/0271614 A1 | 10/2010 | Albuquerque et al. | |
| 2011/0181864 A1 | 7/2011 | Schmitt et al. | |
| 2012/0038903 A1 | 2/2012 | Weimer et al. | |
| 2012/0124113 A1 | 5/2012 | Zalik et al. | |

(56) References Cited

U.S. PATENT DOCUMENTS

| | | |
|---|---|---|
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bösch |
| 2014/0350836 A1 | 11/2014 | Stettner et al. |
| 2015/0078123 A1 | 3/2015 | Batcheller et al. |
| 2015/0084806 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | McCloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Watnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1* | 10/2017 | Eichenholz .......... H01S 3/0078 |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 204885804 U | 12/2015 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212823082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2 000 411 A | 1/1979 |
| JP | 2007144667 A | 6/2007 |
| JP | 2010035385 A | 2/2010 |
| JP | 2017003347 A | 1/2017 |
| JP | 2017138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129408 A1 | 7/2018 |
| WO | 2018/129409 A1 | 7/2018 |
| WO | 2018/129410 A1 | 7/2018 |
| WO | 2018/175990 A1 | 9/2018 |
| WO | 2018/182812 A2 | 10/2018 |
| WO | 2019/079642 A1 | 4/2019 |
| WO | 2019/165095 A1 | 8/2019 |

(56)          References Cited

FOREIGN PATENT DOCUMENTS

| WO | 2019/165289 A1 | 8/2019 |
| WO | 2019/165294 A1 | 8/2019 |
| WO | 2020/013890 A2 | 1/2020 |

OTHER PUBLICATIONS

European Search Report, dated Jul. 17, 2020, for EP Application No. 18776977.3, 12 pages.
European Search Report, dated Jun. 17, 2021, for EP Application No. 18868896.4, 7 pages.
Extended European Search Report, dated Jul. 10, 2020, for EP Application No. 18736738.8, 9 pages.
Extended European Search Report, dated Jul. 22, 2020, for EP Application No. 18736685.1, 10 pages.
Fiber laser, Wikipedia, https://en.wikipedia.org/wiki/Fiber_Jaser, 6 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
International Preliminary Report on Patentability, dated Apr. 30, 2020, for International Application No. PCT/US2018/056577, 8 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jan. 3, 2019, for International Application No. PCT/US2018/056577, 15 pages.
International Search Report and Written Opinion, dated Jul. 9, 2019, for International Application No. PCT/US2019/018987, 17 pages.
International Search Report and Written Opinion, dated Jun. 7, 2018, for International Application No. PCT/US2018/024185, 9 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
International Search Report and Written Opinion, dated Mar. 23, 2018, for International Application No. PCT/US2018/012704, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Sep. 18, 2018, for International Application No. PCT/US2018/012116, 12 pages.
Mirrors, Physics LibreTexts, https://phys.libretexts.org/Bookshelves/Optics/Supplemental_Modules_(Components)/Mirrors, (2021), 2 pages.
Office Action Issued in Japanese Patent Application No. 2019-536019 dated Nov. 30, 2021, 6 pages.
"Why Wavelengths Matter in Fiber Optics", FirstLight, https://www.firstlight.net/why-wavelengths-matter-in-fiber-optics/, (2021), 5 pages.

* cited by examiner

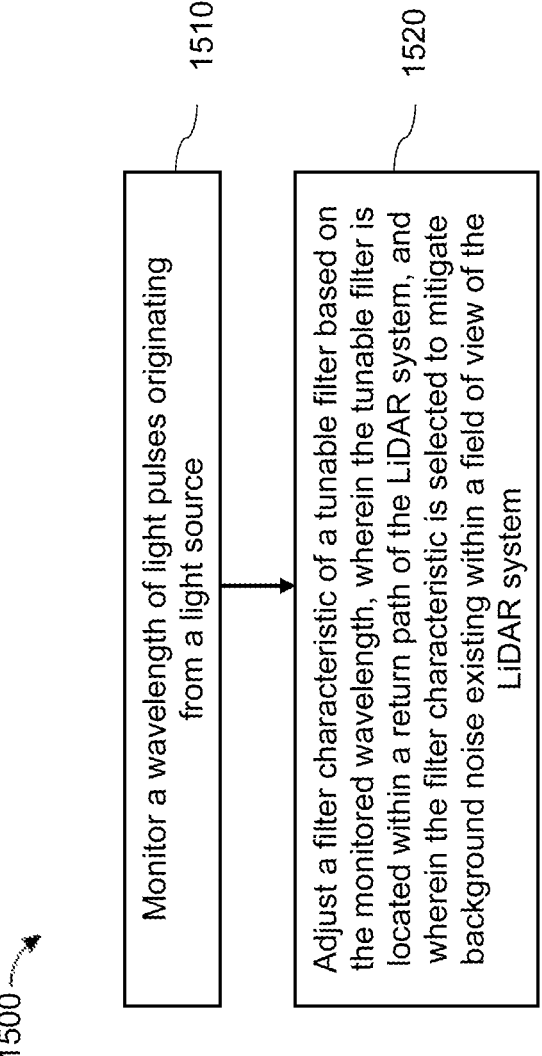

1500

1510

Monitor a wavelength of light pulses originating from a light source

1520

Adjust a filter characteristic of a tunable filter based on the monitored wavelength, wherein the tunable filter is located within a return path of the LiDAR system, and wherein the filter characteristic is selected to mitigate background noise existing within a field of view of the LiDAR system

FIG. 15

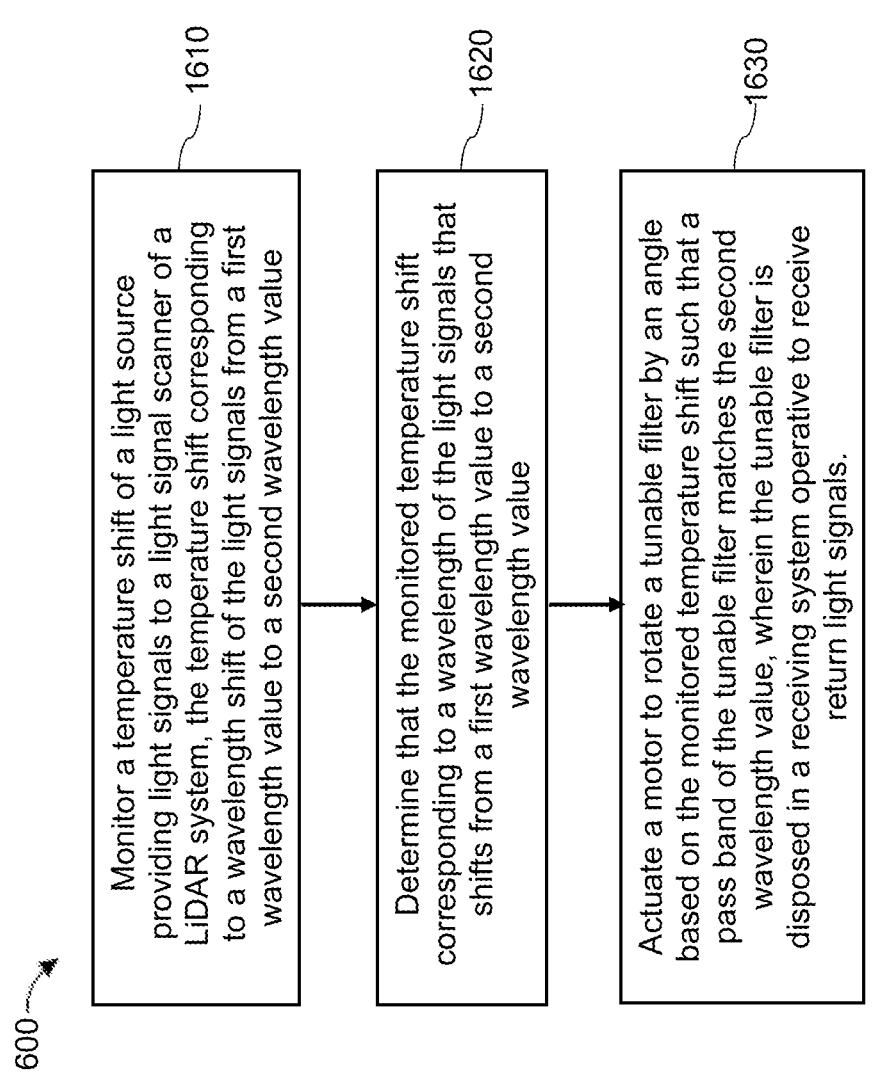

Monitor a temperature shift of a light source providing light signals to a light signal scanner of a LiDAR system, the temperature shift corresponding to a wavelength shift of the light signals from a first wavelength value to a second wavelength value 1610

Determine that the monitored temperature shift corresponding to a wavelength of the light signals that shifts from a first wavelength value to a second wavelength value 1620

Actuate a motor to rotate a tunable filter by an angle based on the monitored temperature shift such that a pass band of the tunable filter matches the second wavelength value, wherein the tunable filter is disposed in a receiving system operative to receive return light signals. 1630

SYSTEMS AND METHODS FOR TUNING FILTERS FOR USE IN LIDAR SYSTEMS

CROSS-REFERENCE TO RELATED APPLICATIONS

This application is a continuation-in-part of U.S. patent application Ser. No. 16/546,724 filed Aug. 21, 2019, entitled "SYSTEMS AND METHODS FOR TUNING FILTERS FOR USE IN LIDAR SYSTEMS", which claims the benefit of U.S. Provisional Patent Application Ser. No. 62/722,498, filed Aug. 24, 2018, entitled "SYSTEMS AND METHODS FOR TUNING FILTERS FOR USE IN LIDAR SYSTEMS". The contents of both applications are hereby incorporated by reference in their entireties for all purposes.

FIELD OF THE TECHNOLOGY

This disclosure relates generally to light detection and, more particularly, to a light detection and ranging (LiDAR) system having tunable filters to improve light detection.

BACKGROUND

Light detection and ranging (LiDAR) systems use light signals to create an image or point cloud of the external environment. A LiDAR system may be a scanning or non-scanning system. Some typical scanning LiDAR systems include a light source, a light transmitter, a light steering system, and a light detector. The light source generates a light beam that is directed by the light steering system in particular directions when being transmitted from the LiDAR system. When a transmitted light beam is scattered or reflected by an object, a portion of the scattered or reflected light returns to the LiDAR system to form a return light signal. The light detector detects the return light signal. Using the difference between the time that the return light signal is detected and the time that a corresponding light signal in the light beam is transmitted, the LiDAR system can determine the distance to the object based on the speed of light. This technique of determining the distance is referred to as the time-of-flight (ToF) technique. The light steering system can direct light beams along different paths to allow the LiDAR system to scan the surrounding environment and produce images or point clouds. A typical non-scanning LiDAR system illuminates an entire field-of-view (FoV) rather than scanning through the FoV. An example of the non-scanning LiDAR system is a flash LiDAR, which can also use the ToF technique to measure the distance to an object. LiDAR systems can also use techniques other than time-of-flight and scanning to measure the surrounding environment.

SUMMARY

Embodiments provided in this disclosure use temperature monitor circuitry and tunable filters in a light detection and ranging (LiDAR) system to improve light detection and compensate for wavelength shifts caused by ambient environmental changes.

In one embodiment, a LiDAR system comprising one or more tunable filters is provided. The one or more tunable filters can be tuned to compensate for wavelength shifts of light signals caused by ambient environmental changes. The LiDAR system includes a light source providing light signals, a signal steering system configured to direct the light signals to a field-of-view (FoV), and temperature monitoring circuitry configured to monitor a temperature shift of the light source. The temperature shift corresponds to a wavelength shift of the light signals from a first wavelength value to a second wavelength value. The system further comprises a tunable filter positioned in a receiving system configured to receive return light signals. The system further comprises a motor configured to rotate the tunable filter by an angle based on the temperature shift such that a passband of the tunable filter matches the second wavelength value.

In one embodiment, a vehicle comprising a light detection and ranging (LiDAR) system is provided. The LiDAR system includes a light source providing light signals, and a signal steering system configured to direct the light signals to a FoV. The system further includes temperature monitoring circuitry configured to monitor a temperature shift of the light source in the vehicle. The temperature shift corresponds to a wavelength shift of the light signals from a first wavelength value to a second wavelength value. The system further includes a motor configured to rotate a tunable filter by an angle based on the temperature shift such that a passband of the tunable filter matches the second wavelength value. The tunable filter is disposed in a receiving system configured to receive return light signals.

In one embodiment, a method to improve light detection in a LiDAR system is provided. The method includes monitoring a temperature shift of a light source providing light signals to a light signal scanner of a light ranging and detection (LiDAR) system. The temperature shift corresponds to a wavelength shift of the light signals from a first wavelength value to a second wavelength value. The method further includes determining that the monitored temperature shift corresponding to a wavelength of the light signals that shifts from a first wavelength value to a second wavelength value; and actuating a motor to rotate a tunable filter by an angle based on the monitored temperature shift such that a passband of the tunable filter matches the second wavelength value. The tunable filter is disposed in a receiving system configured to receive return light signals.

BRIEF DESCRIPTION OF THE DRAWINGS

The present application can be best understood by reference to the embodiments described below taken in conjunction with the accompanying drawing figures, in which like parts may be referred to by like numerals.

FIG. 15 shows an illustrative method for using a LiDAR system with a tunable filter according to some embodiments.

FIG. 16 shows another illustrative method for using a LiDAR system with a tunable filter according to some embodiments.

DETAILED DESCRIPTION

Figure 1:
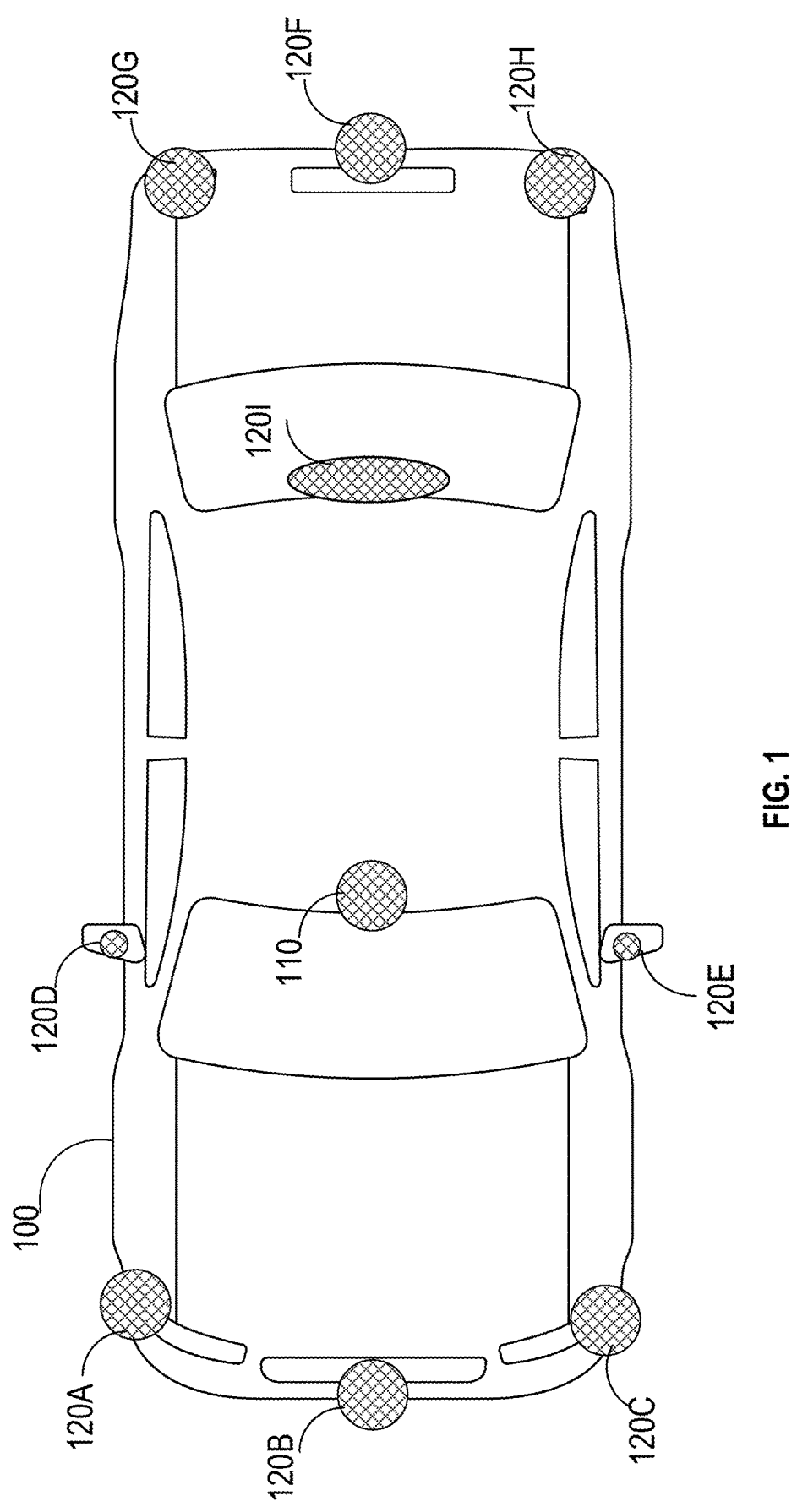
FIG. 1 illustrates one or more example LiDAR systems disposed or included in a motor vehicle.

To provide a more thorough understanding of various embodiments of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices. The components or devices can be optical, mechanical, and/or electrical devices.

Although the following description uses terms "first," "second," etc. to describe various elements, these elements should not be limited by the terms. These terms are only used to distinguish one element from another. For example, a first optic could be termed a second optic and, similarly, a second optic could be termed a first optic, without departing from the scope of the various described examples. The first optic and the second optic can both be optics and, in some cases, can be separate and different optics.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, or any other volatile or non-volatile storage devices). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

LiDAR systems are often used in a moveable platform, such as a vehicle, a plane, a drone, a train, a bicycle, etc. A LiDAR system often includes a light source for providing transmission light signals. Ambient environmental changes, e.g., temperature fluctuations, may have a significant effect on the light source and thus the transmission light signals in the LiDAR system. If a LiDAR system is mounted to a vehicle, it may be exposed to a wide temperature shift range. For instance, a range of the temperature shift of the light source can be from, for example, about −40° C. to 105° C. The wavelength of the light signals provided by the light source shifts due to the temperature fluctuations. For example, a center wavelength of the light signals from a diode laser may shift about 30 nm or more for a temperature fluctuation from about −40° C. to 85° C.

When the LiDAR system transmits light signals to a field-of-view (FoV), the transmission light signals are reflected or scattered from one or more objects to form return light signals. The return light signals are received by a receiving system. A LiDAR system may also include one or more filters in the receiving system to filter out light signals that are outside of a wavelength range of the return light signals. The return light signals typically have the same wavelength range as the transmission light signals. Thus, the wavelength of the return light signals may shift if the wavelength of the transmission light signals shifts. For example, when the return light signals go into a filter, correspondingly, a center wavelength of the return light signals may also shift about 30 nm or more if the temperature fluctuation is from about −40° C. to 85° C.

One way to mitigate the wavelength shift problem is to add a cooling system to the laser source to maintain a stable temperature. However, when the LiDAR system is used in a moveable platform, it is energy consuming and technically challenging to add a cooling system to stabilize a temperature within an acceptable range that does not cause much wavelength shifting. In addition, there may not be enough physical space to isolate the light source of the LiDAR system by installing a cooling system in a vehicle.

Therefore, in order for return light signals to be processed in a detector of the LiDAR system, filters are used to accommodate for the wavelength shifts of the light source. One approach uses fixed bandpass filters with a relatively wide passband that takes into account the entirety of potential wavelength variations, including the laser center wavelength variation, the filter center wavelength variation, the spectral broadening from angle of incidence, and the spectral shifts due to thermal variations. In such cases, a bandwidth of about 30 nm is needed for a bandpass filter to accommodate light source wavelength shifts due to temperature fluctuations from −40 to 105° C. The drawbacks of such an approach, however, is that it causes higher background noises and lower signal-to-noise ratio, because a high number of received light signals may be blocked by the wideband filter before reaching the light detector. As a result, the signal strength of the return light signals decreases, thereby reducing the amount of light that can be detected by the light detector. In turn, it reduces the signal-to-noise ratio and the detection performance of the LiDAR system.

Embodiments discussed herein improve light detection performance by using a combination of temperature monitoring circuitry and one or more tunable filters. The one or more filters can be tuned to compensate wavelength shifts due to temperature fluctuations such that a narrow bandpass filter (e.g., the narrowest possible bandpass filter having a passband that is narrower than 10 nm) can be used, thereby blocking more background radiation from passing through the bandpass filter and in turn increasing the signal-to-noise ratio and the detection performance of the LiDAR system.

Embodiments of present invention are described below. In various embodiments of the present invention, a LiDAR system comprising one or more filters is provided. The one or more filters can be tuned to compensate for wavelength shifts of light signals caused by ambient environmental changes. In one embodiment, the LiDAR system includes a light source providing light signals, a signal steering system configured to direct the light signals to a FoV, and temperature monitoring circuitry configured to monitor a temperature shift of the light source. The temperature shift corresponds to a wavelength shift of the light signals from a first wavelength value to a second wavelength value. The LiDAR system further comprises a tunable filter positioned in a receiving system configured to receive return light signals. The LiDAR system further comprises a motor configured to rotate the tunable filter by an angle based on the temperature shift such that a passband of the tunable filter matches the second wavelength value.

FIG. 1 illustrates one or more example LiDAR systems 110 disposed or included in a motor vehicle 100. Vehicle 100 can be a car, a sport utility vehicle (SUV), a truck, a train, a wagon, a bicycle, a motorcycle, a tricycle, a bus, a mobility scooter, a tram, a ship, a boat, an underwater vehicle, an airplane, a helicopter, a unmanned aviation vehicle (UAV), a spacecraft, etc. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-120I. Each of LiDAR systems 110 and 120A-120I can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FoV). A non-scanning based LiDAR system transmits laser light to illuminate an FoV without scanning. For example, a flash LiDAR is a type of non-scanning based LiDAR system. A flash LiDAR can transmit laser light to simultaneously illuminate an FoV using a single light pulse or light shot.

A LiDAR system is a frequently-used sensor of a vehicle that is at least partially automated. In one embodiment, as shown in FIG. 1, motor vehicle 100 may include a single LiDAR system 110 (e.g., without LiDAR systems 120A-120I) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-120I. As shown in FIG. 1, in one embodiment, multiple LiDAR systems 110 and/or 120A-120I are attached to vehicle 100 at different locations of the vehicle. For example, LiDAR system 120A is attached to vehicle 100 at the front right corner; LiDAR system 120B is attached to vehicle 100 at the front center position; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; LiDAR system 120F is attached to vehicle 100 at the back center position; LiDAR system 120G is attached to vehicle 100 at the back right corner; LiDAR system 120H is attached to vehicle 100 at the back left corner; and/or LiDAR system 120I is attached to vehicle 100 at the center towards the backend (e.g., back end of the vehicle roof). It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

In some embodiments, LiDAR systems 110 and 120A-120I are independent LiDAR systems having their own respective laser sources, control electronics, transmitters, receivers, and/or steering mechanisms. In other embodiments, some of LiDAR systems 110 and 120A-120I can share one or more components, thereby forming a distributed sensor system. In one example, optical fibers are used to deliver laser light from a centralized laser source to all LiDAR systems. For instance, system 110 (or another system that is centrally positioned or positioned anywhere inside the vehicle 100) includes a light source, a transmitter, and a light detector, but have no steering mechanisms. System 110 may distribute transmission light to each of systems 120A-120I. The transmission light may be distributed via optical fibers. Optical connectors can be used to couple the optical fibers to each of system 110 and 120A-120I. In some examples, one or more of systems 120A-120I include steering mechanisms but no light sources, transmitters, or light detectors. A steering mechanism may include one or more moveable mirrors such as one or more polygon mirrors, one or more single plane mirrors, one or more multi-plane mirrors, or the like. Embodiments of the light source, transmitter, steering mechanism, and light detector are described in more detail below. Via the steering mechanisms, one or more of systems 120A-120I scan light into one or more respective FoVs and receive corresponding return light. The return light is formed by scattering or reflecting the transmission light by one or more objects in the FoVs. Systems 120A-120I may also include collection lens and/or other optics to focus and/or direct the return light into optical fibers, which deliver the received return light to system 110. System 110 includes one or more light detectors for detecting the received return light. In some examples, system 110 is disposed inside a vehicle such that it is in a temperature-controlled environment, while one or more systems 120A-120I may be at least partially exposed to the external environment.

Figure 2:
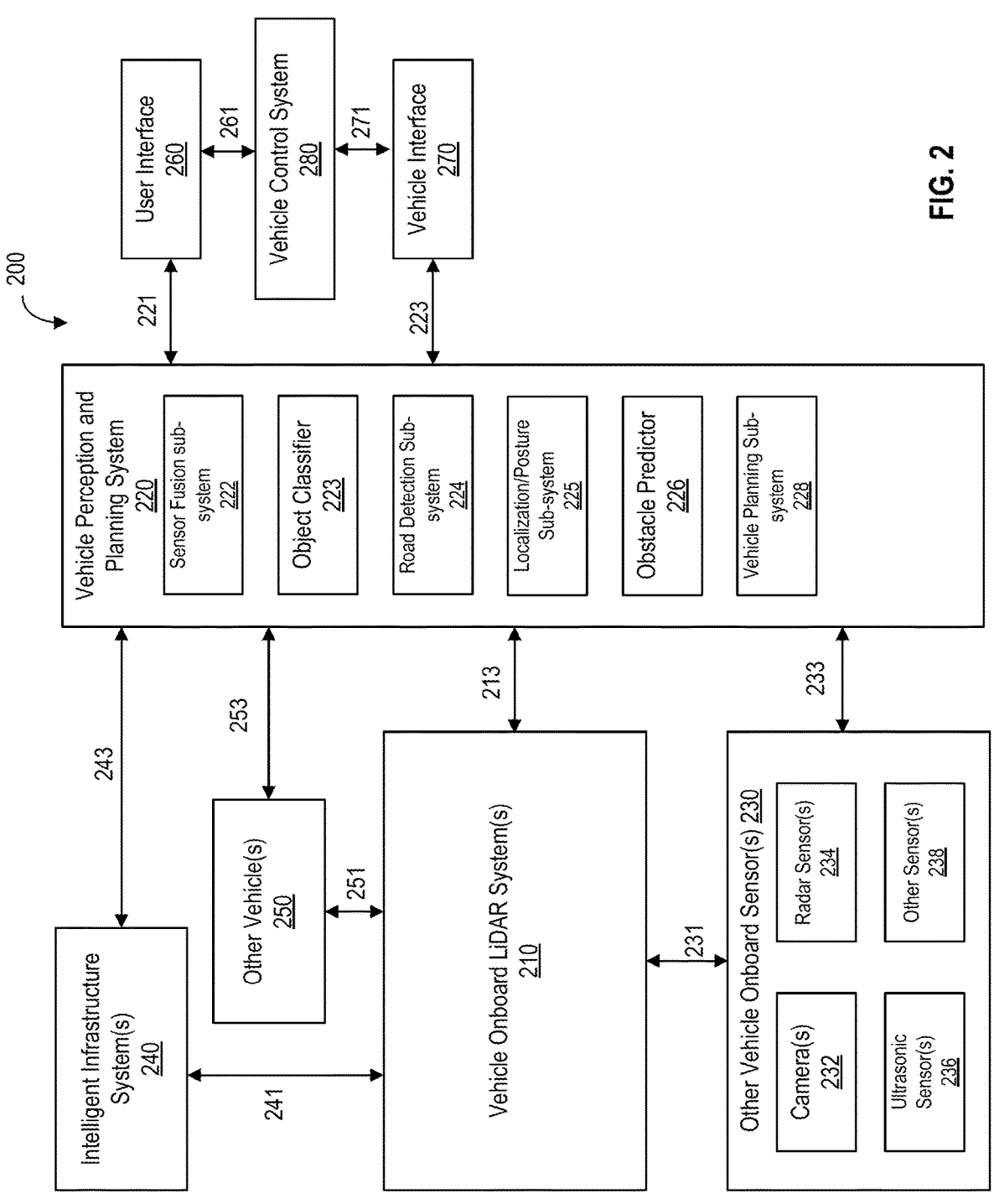
FIG. 2 is a block diagram illustrating interactions between an example LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-50 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 70-200 meters from the LiDAR sensor. Medium-range LiDAR sensors can be used for, e.g., monitoring road intersections, assistance for merging onto or leaving a freeway, or the like. A long-range LiDAR sensor measures objects located up to about 200 meters and beyond. Long-range LiDAR sensors are typically used when a vehicle is travelling at a high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are configured to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera includes image sensors that facilitates producing monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data. Camera(s) 232 can be mount on, or integrated to, a vehicle at any locations (e.g., rear-view mirrors, pillars, front grille, and/or back bumpers, etc.).

Other vehicle onboard sensos(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations. Radar sensor(s) 234 can be mount on, or integrated to, a vehicle at any locations (e.g., rear-view mirrors, pillars, front grille, and/or back bumpers, etc.).

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, checking blind spots, identifying parking spaces, providing lane changing assistance into traffic, or the like. Sensor data generated by ultrasonic sensor(s) 236 can also be provided to vehicle perception and planning system 220 via communication path 233 for further processing and controlling the vehicle operations. Ultrasonic sensor(s) 236 can be mount on, or integrated to, a vehicle at any locations (e.g., rear-view mirrors, pillars, front grille, and/or back bumpers, etc.).

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultra-sonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud or edge computing service provider for processing and then the processing results can be transmitted back to the vehicle perception and planning system 220 and/or LiDAR system 210).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210 (or with other LiDAR systems located in other vehicles), thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa.

Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffic in the opposite direction. In such a situation, sensors of intelligent infrastructure system(s) 240 can provide useful data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can use any computer vision techniques to detect and classify the objects and estimate the positions of the objects. In some embodiments, object classifier 223 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include one or more planners such as a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. In some examples, vehicle perception and planning system 220 may further comprise a user interface 260, which provides a user (e.g., a driver) access to vehicle control system 280 to, for example, override or take over control of the vehicle when necessary. User interface 260 may also be separate from vehicle perception and planning system 220. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
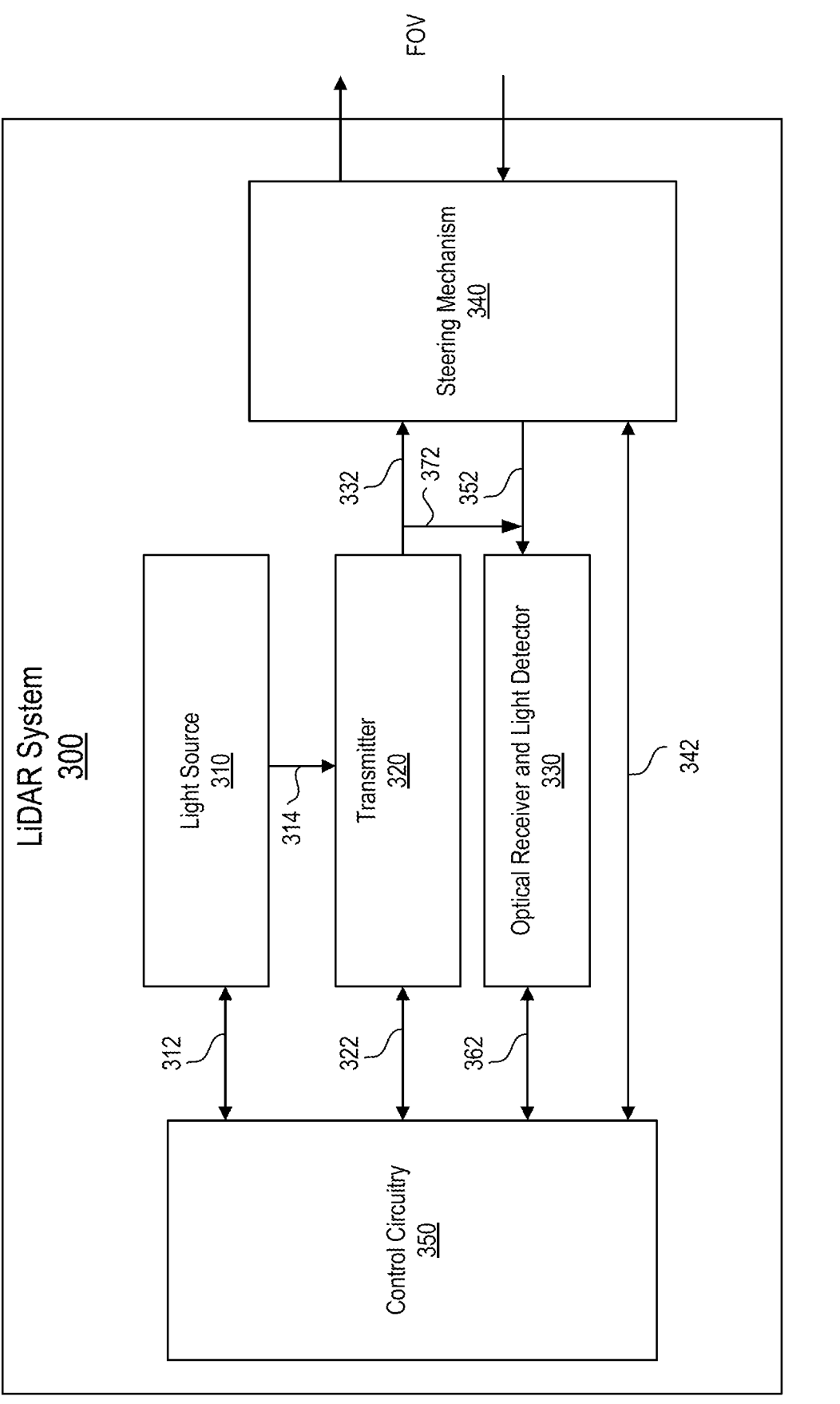
FIG. 3 is a block diagram illustrating an example LiDAR system.

FIG. 3 is a block diagram illustrating an example LiDAR system 300. LiDAR system 300 can be used to implement LiDAR systems 110, 120A-120I, and/or 210 shown in FIGS. 1 and 2. In one embodiment, LiDAR system 300 comprises a light source 310, a transmitter 320, an optical receiver and light detector 330, a steering system 340, and a control circuitry 350. These components are coupled together using communications paths 312, 314, 322, 332, 342, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between light source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

In some embodiments, LiDAR system 300 can be a coherent LiDAR system. One example is a frequency-modulated continuous-wave (FMCW) LiDAR. Coherent LiDARs detect objects by mixing return light from the objects with light from the coherent laser transmitter. Thus, as shown in FIG. 3, if LiDAR system 300 is a coherent LiDAR, it may include a route 372 providing a portion of transmission light from transmitter 320 to optical receiver and light detector 330. The transmission light provided by transmitter 320 may be modulated light and can be split into two portions. One portion is transmitted to the FoV, while the second portion is sent to the optical receiver and light detector of the LiDAR system. The second portion is also referred to as the light that is kept local (LO) to the LiDAR system. The transmission light is scattered or reflected by various objects in the FoV and at least a portion of it forms return light. The return light is subsequently detected and interferometrically recombined with the second portion of the transmission light that was kept local. Coherent LiDAR provides a means of optically sensing an object's range as well as its relative velocity along the line-of-sight (LOS).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Light source 310 outputs laser light for illuminating objects in a field of view (FoV). The laser light can be infrared light having a wavelength in the range of 700 nm to 1 mm. Light source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), an external-cavity diode laser, a vertical-external-cavity surface-emitting laser, a distributed feedback (DFB) laser, a distributed Bragg reflector (DBR) laser, an interband cascade laser, a quantum cascade laser, a quantum well laser, a double heterostructure laser, or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, light source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a diode laser (e.g., a Fabry-Perot cavity laser, a distributed feedback laser), a solid-state bulk laser, or a tunable external-cavity diode laser. In some embodiments, light source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., ND:YVO$_4$) laser crystals. In some examples, light source 310 may have multiple amplification stages to achieve a high power gain such that the laser output can have high power, thereby enabling the LiDAR system to have a long scanning range. In some examples, the power amplifier of light source 310 can be controlled such that the power gain can be varied to achieve any desired laser output power.

Figure 4:
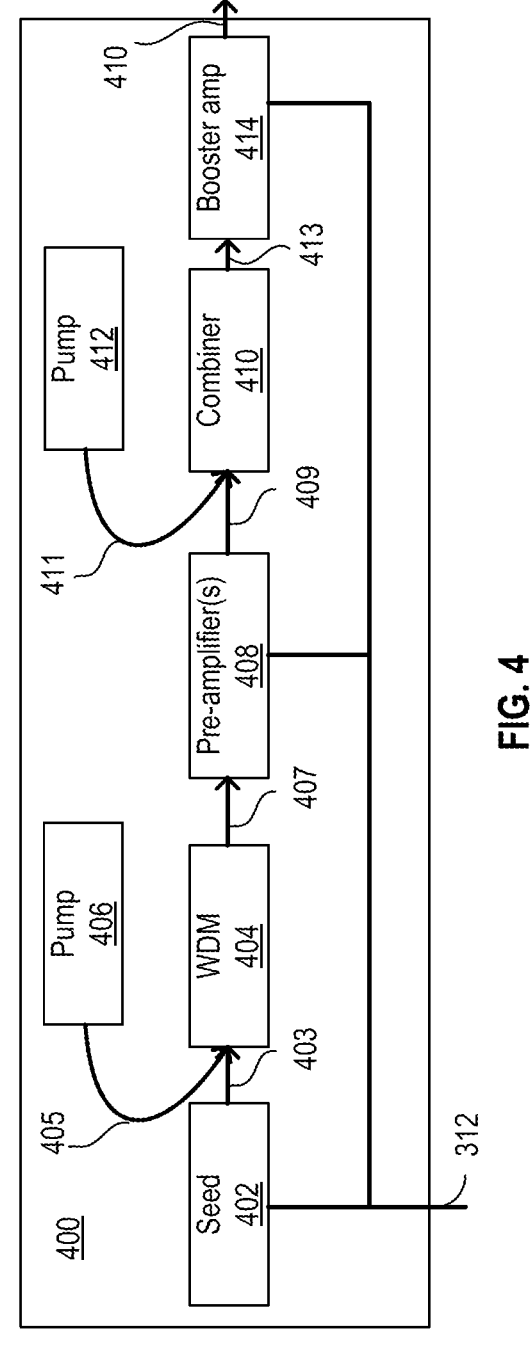
FIG. 4 is a block diagram illustrating an example fiber-based laser source.

FIG. 4 is a block diagram illustrating an example fiber-based laser source 400 having a seed laser and one or more pumps (e.g., laser diodes) for pumping desired output power. Fiber-based laser source 400 is an example of light source 310 depicted in FIG. 3. In some embodiments, fiber-based laser source 400 comprises a seed laser 402 to generate initial light pulses of one or more wavelengths (e.g., infrared wavelengths such as 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 10-30 dB gain). In some embodiments, pre-amplifier(s) 408 are low noise amplifiers. Pre-amplifier(s) 408 output to an optical combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides combined optical signals to a booster amplifier 414, which produces output light pulses via optical fiber 410. The booster amplifier 414 provides further amplification of the optical signals (e.g., another 20-40 dB). The outputted light pulses can then be transmitted to transmitter 320 and/or steering mechanism 340 (shown in FIG. 3). It is understood that FIG. 4 illustrates one example configuration of fiber-based laser source 400. Laser source 400 can have many other configurations using different combinations of one or more components shown in FIG. 4 and/or other components not shown in FIG. 4 (e.g., other components such as power supplies, lens(es), filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based laser source 400. Fiber-based laser source 400 can also include other components not shown, such as one or more power connectors, power supplies, and/or power lines.

Referencing FIG. 3, typical operating wavelengths of light source 310 comprise, for example, about 850 nm, about 905 nm, about 940 nm, about 1064 nm, and about 1550 nm. For laser safety, the upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from light source 310 can be characterized by its peak power, average power, pulse energy, and/or the pulse energy density. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. In general, the smaller the time interval between the pulses, the higher the PRR. The PRR typically corresponds to the maximum range that a LiDAR system can measure. Light source 310 can be configured to produce pulses at high PRR to meet the desired number of data points in a point cloud generated by the LiDAR system. Light source 310 can also be configured to produce pulses at medium or low PRR to meet the desired maximum detection distance. Wall plug efficiency (WPE) is another factor to evaluate the total power consumption, which may be a useful indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring light source 310 and/or designing laser delivery systems for vehicle-mounted LiDAR applications.

It is understood that the above descriptions provide non-limiting examples of a light source 310. Light source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Light source 310 provides laser light (e.g., in the form of a laser beam) to transmitter 320. The laser light provided by light source 310 can be amplified laser light with a predetermined or controlled wavelength, pulse repetition rate, and/or power level. Transmitter 320 receives the laser light from light source 310 and transmits the laser light to steering mechanism 340 with low divergence. In some embodiments, transmitter 320 can include, for example, optical components (e.g., lens, fibers, mirrors, etc.) for transmitting one or more laser beams to a field-of-view (FoV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by light source 310 may diverge as they travel to transmitter 320. Therefore, transmitter 320 often comprises a collimating lens configured to collect the diverging laser beams and produce more parallel optical beams with reduced or minimum divergence. The collimated optical beams can then be further directed through various optics such as mirrors and lens. A collimating lens may be, for example, a single plano-convex lens or a lens group. The collimating lens can be configured to achieve any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to have good laser beam quality in the generated transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. Therefore, light source 310 and/or transmitter 320 can be configured to meet, for example, a scan resolution requirement while maintaining the desired $M^2$ factor.

One or more of the light beams provided by transmitter 320 are scanned by steering mechanism 340 to a FoV. Steering mechanism 340 scans light beams in multiple dimensions (e.g., in both the horizontal and vertical dimension) to facilitate LiDAR system 300 to map the environment by generating a 3D point cloud. A horizontal dimension can be a dimension that is parallel to the horizon or a surface associated with the LiDAR system or a vehicle (e.g., a road surface). A vertical dimension is perpendicular to the horizontal dimension (i.e., the vertical dimension forms a 90-degree angle with the horizontal dimension). Steering mechanism 340 will be described in more detail below. The laser light scanned to a FoV may be scattered or reflected by an object in the FoV. At least a portion of the scattered or reflected light forms return light that returns to LiDAR system 300. FIG. 3 further illustrates an optical receiver and light detector 330 configured to receive the return light. Optical receiver and light detector 330 comprises an optical receiver that is configured to collect the return light from the FoV. The optical receiver can include optics (e.g., lens, fibers, mirrors, etc.) for receiving, redirecting, focusing, amplifying, and/or filtering return light from the FoV. For example, the optical receiver often includes a collection lens (e.g., a single plano-convex lens or a lens group) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FoV can be derived. One example method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise, for example, an APD (avalanche photodiode) based structure, a PMT (photomultiplier tube) based structure, a SiPM (Silicon photomultiplier) based structure, a SPAD (single-photon avalanche diode) based structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise. In some embodiments, optical receiver and light detector 330 may include a pre-amplifier that is a low noise amplifier (LNA). In some embodiments, the pre-amplifier may also include a transimpedance amplifier (TIA), which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implementing signal processing techniques (e.g., filtering, noise reduction, amplification, or the like). For example, in addition to, or instead of, using direct detection of return signals (e.g., by using ToF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism, a scanning mechanism, or simply a light scanner. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FoV without mechanically moving any macroscopic components such as the transceiver. Solid-state scanning mechanisms include, for example, optical phased arrays based steering and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an example non-scanning LiDAR system).

Steering mechanism 340 can be used with a transceiver (e.g., transmitter 320 and optical receiver and light detector 330) to scan the FoV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), single-plane or multi-plane mirror(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or multiple scanning devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s), or a combination thereof, for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lenses) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap or completely overlap).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling light source 310 to obtain the desired laser pulse timing, the pulse repetition rate, and power; controlling steering mechanism 340 (e.g., controlling the speed, direction, and/or other parameters) to scan the FoV and maintain pixel registration and/or alignment; controlling optical receiver and light detector 330 (e.g., controlling the sensitivity, noise reduction, filtering, and/or other parameters) such that it is an optimal state; and monitoring overall system health/status for functional safety (e.g., monitoring the laser output power and/or the steering mechanism operating status for safety).

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; derives the reflectivity of an object in the FoV, and/or determines any other type of data relevant to LiDAR system 300.

LiDAR system 300 can be disposed in a vehicle, which may operate in many different environments including hot or cold weather, rough road conditions that may cause intense vibration, high or low humidities, dusty areas, etc. Therefore, in some embodiments, optical and/or electronic components of LiDAR system 300 (e.g., optics in transmitter 320, optical receiver and light detector 330, and steering mechanism 340) are disposed and/or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), fairing(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one example LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
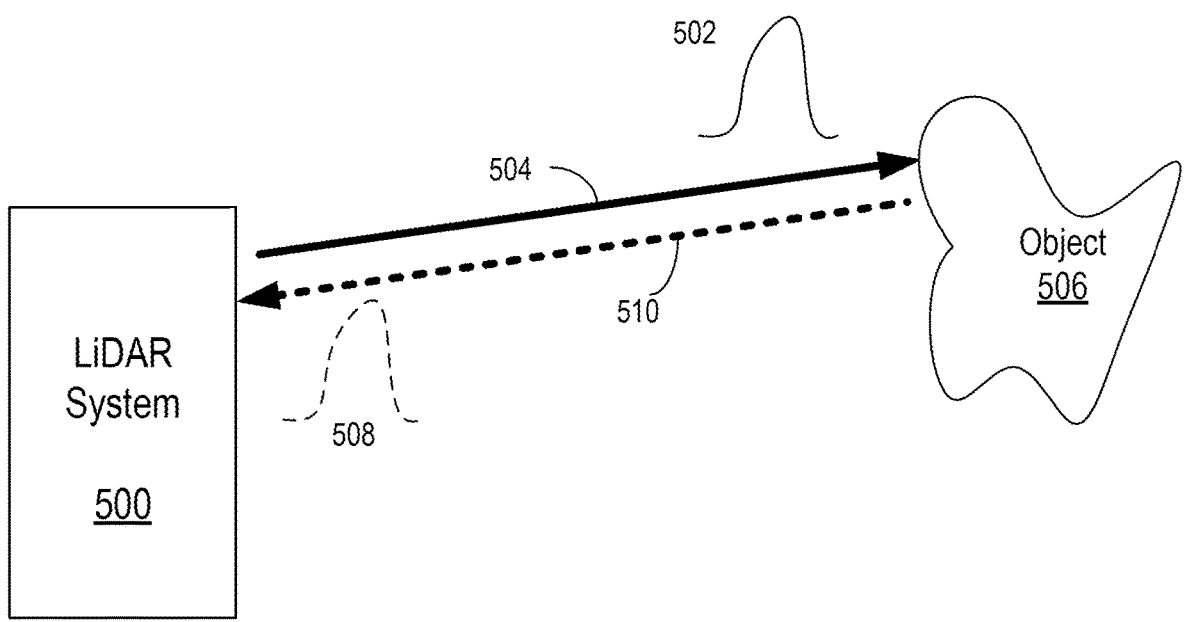
FIGS. 5A-5C illustrate an example LiDAR system using pulse signals to measure distances to objects disposed in a field-of-view (FoV).

As described above, some LiDAR systems use the time-of-flight (ToF) of light signals (e.g., light pulses) to determine the distance to objects in a light path. For example, with reference to FIG. 5A, an example LiDAR system 500 includes a laser light source (e.g., a fiber laser), a steering mechanism (e.g., a system of one or more moving mirrors), and a light detector (e.g., a photodetector with one or more optics). LiDAR system 500 can be implemented using, for example, LiDAR system 300 described above. LiDAR system 500 transmits a light pulse 502 along light path 504 as determined by the steering mechanism of LiDAR system 500. In the depicted example, light pulse 502, which is generated by the laser light source, is a short pulse of laser light. Further, the signal steering mechanism of the LiDAR system 500 is a pulsed-signal steering mechanism. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to form a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figures 5B, 5C:
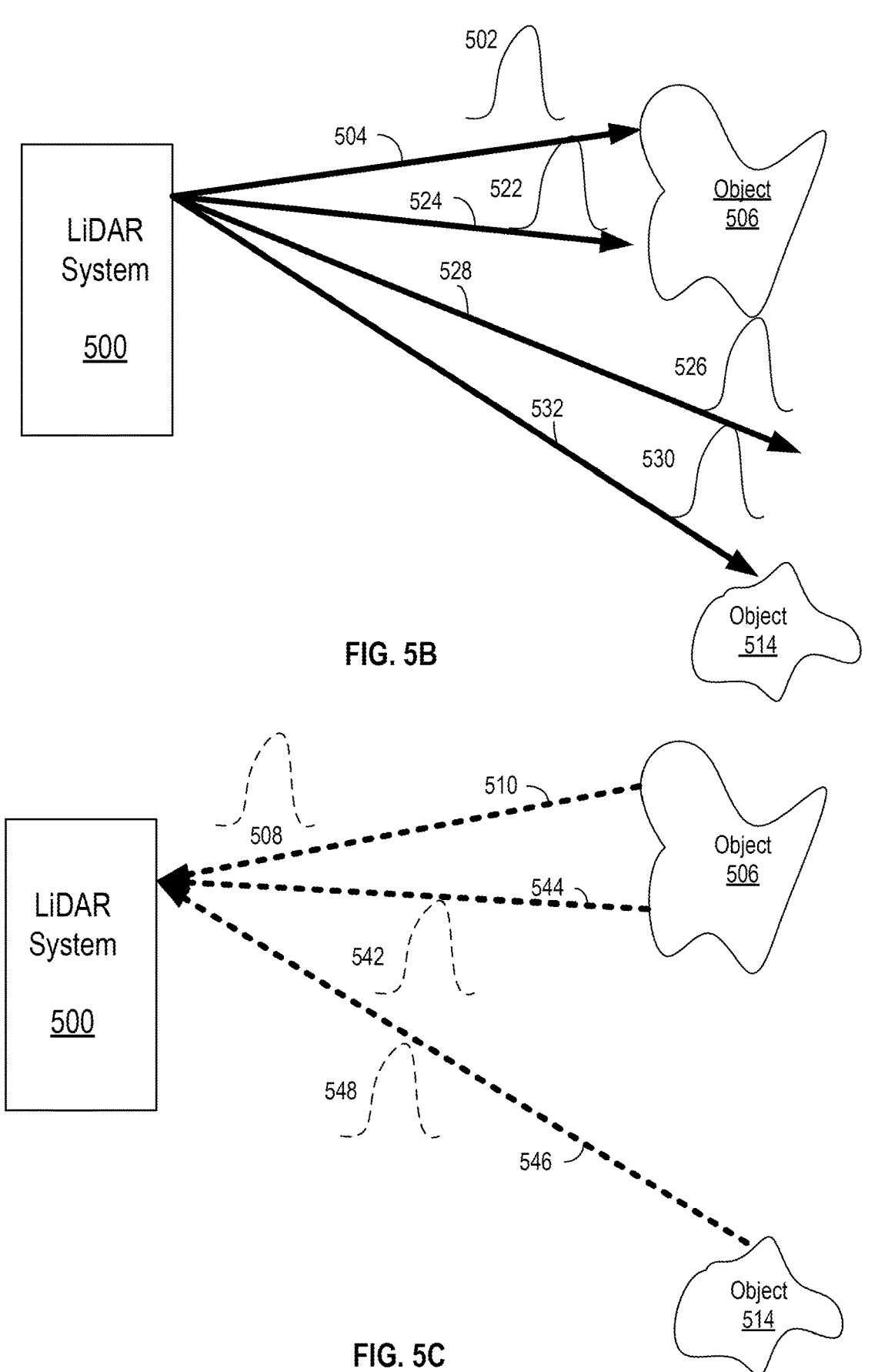

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are formed by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then LiDAR system 500 may determine that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. That is, LiDAR system 500 can be configured to perform a point scan, a line scan, a one-shot without scanning, or a combination thereof. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source in the LiDAR system may have a higher pulse repetition rate (PRR). On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an example LiDAR system that can transmit laser pulses with a pulse repetition rate between 500 kHz and 1 MHz. Based on the time it takes for a pulse to return to the LiDAR system and to avoid mix-up of return pulses from consecutive pulses in a typical LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques (e.g., pulse encoding techniques) are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Various systems, apparatus, and methods described herein may be implemented using a computer program product tangibly embodied in an information carrier, e.g., in a non-transitory machine-readable storage device, for execution by a programmable processor; and the method processes and steps described herein, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
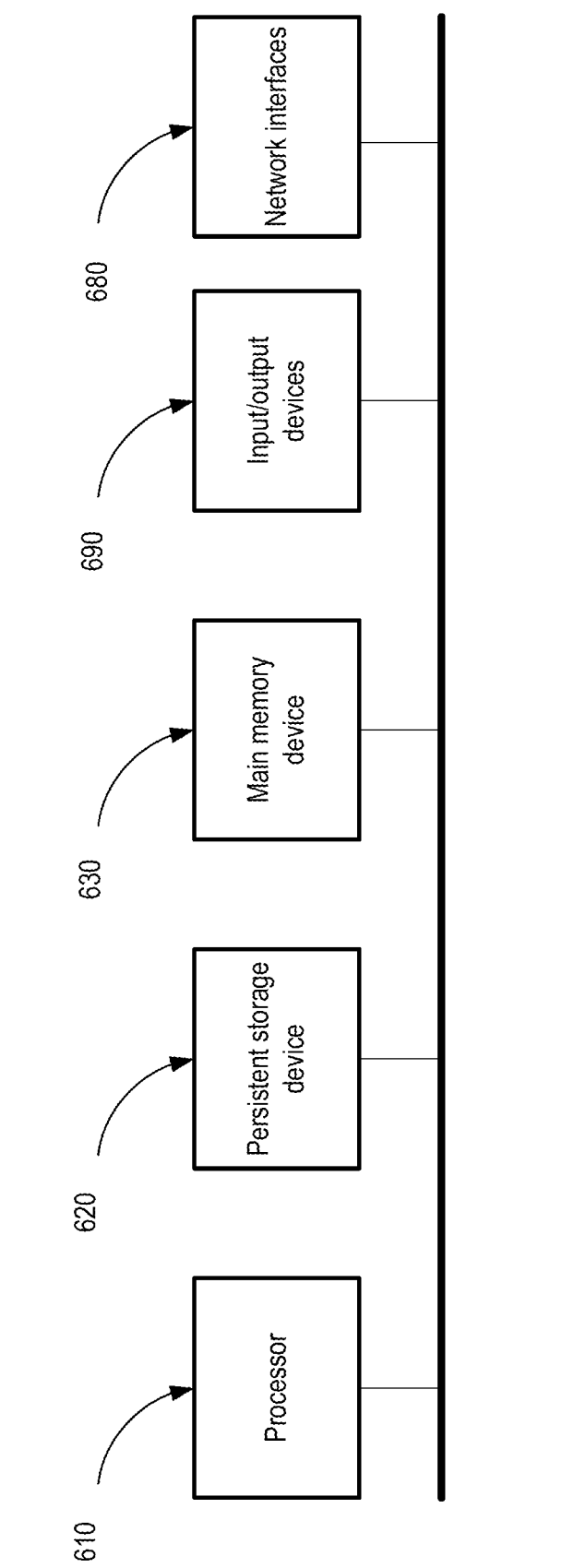
FIG. 6 is a block diagram illustrating an example apparatus used to implement systems, apparatus, and methods in various embodiments.

A high-level block diagram of an example apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, the method steps can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps discussed herein. Accordingly, by executing the computer program instructions, the processor 610 executes an algorithm defined by the method steps. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EE-PROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7:
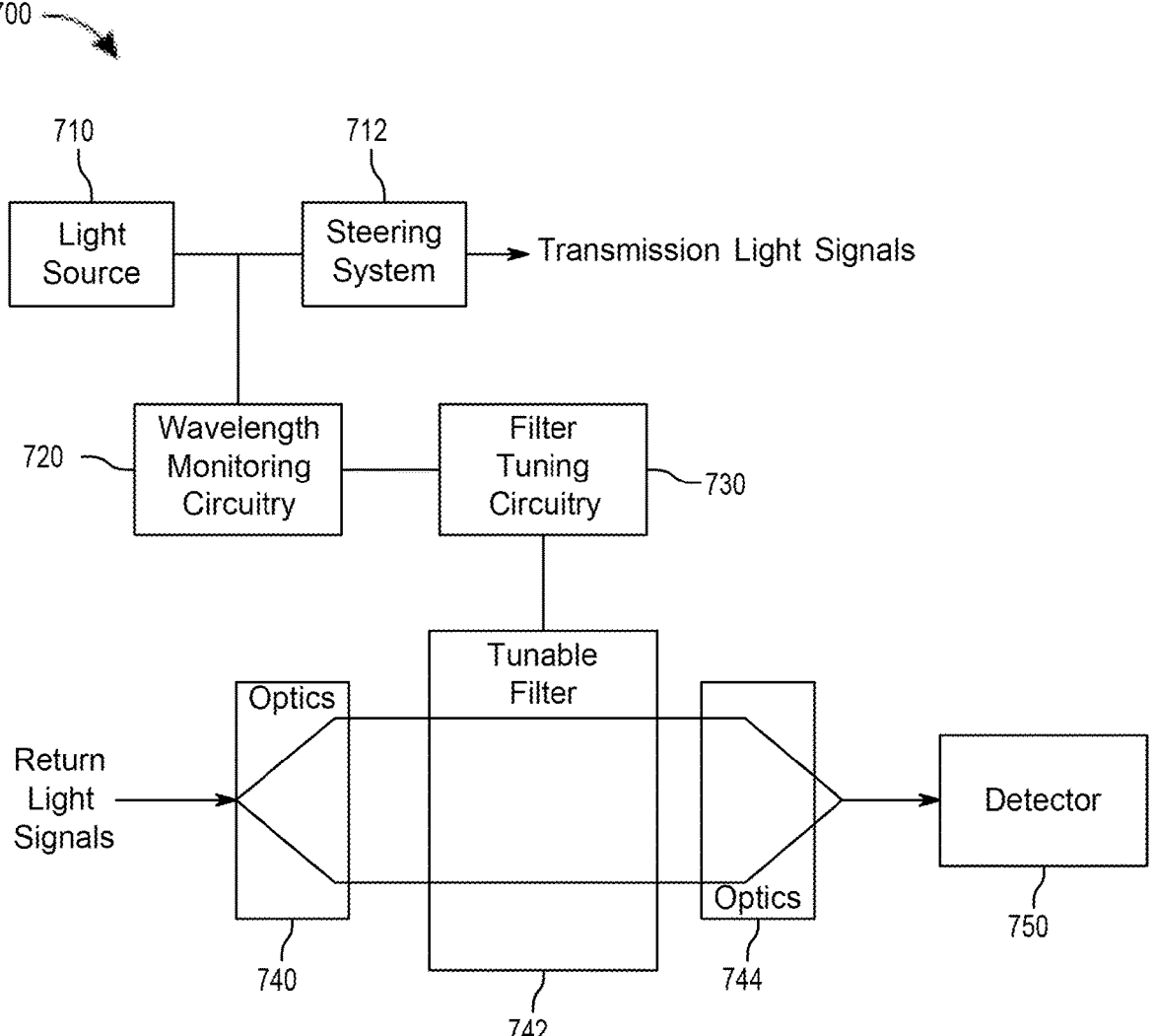
FIG. 7 is a block diagram of an example LiDAR system according to an embodiment.

FIG. 7 is a block diagram of a LiDAR system 700 according to an embodiment. The LiDAR system 700 includes a light source 710 providing light signals, a signal steering system 712, and a detector 750. A transmission light path can include the light source 710 and the signal steering system 712. Light source 710 and signal steering system 712 may be the same or similar to light source 310 and steering mechanism 340, respectively, as described above. In one embodiment, the light source 710 generates light signals and directs the light signals to the signal steering system 712. The signal steering system 712 scans the light signals to locations within a field-of-view (FoV) of the LiDAR system 700, thereby forming transmission light signals (e.g., transmitted light pulses). The transmission light signals may be reflected or scattered by one or more objects in the FoV to form return light signals. The return light signals are received by a receiving system.

If the LiDAR system 700 is mounted to a vehicle, the ambient environmental changes may have a significant effect on the light source 710, thereby causing wavelength shifts of the transmission light signals. For example, the center wavelength of a diode laser from light source 710 may shift 30 nm or more for a temperature fluctuation from about −40° C. to 85° C.

With reference still to FIG. 7, to compensate for the wavelength shift due to the ambient environmental changes, the LiDAR system 700 further comprises wavelength monitoring circuitry 720, filter tuning circuitry 730, and a tunable filter 742. The wavelength monitoring circuitry 720 is configured to monitor a wavelength of the light signals provided by the light source 710 to the signal steering system 720. For instance, if there is a temperature fluctuation, the wavelength monitoring circuitry 720 can determine that the monitored wavelength of the light signals shifts from a first wavelength value to a second wavelength value. The first and second wavelength values are different values. In some embodiments, the wavelength monitoring circuitry 720 includes circuitry for monitoring at least one of environmental factors leading to the wavelength shifts. Such environmental factors include, for example, temperature, humidity, radiation, and interferences.

As described above, LiDAR system 700 receives return light signals formed based on the transmission light signals. The return light signals typically have a same wavelength range as the transmission light signals. Thus, the wavelength of the return light signals may shift if the wavelength of the transmission light signals shifts. For example, similar to the wavelength shift of the transmission light signals, the wavelength of return light signals may also shift from a first wavelength value to a second wavelength value. The tunable filter 742 is disposed in the receiving system configured to receive return light signals. In some embodiments, tunable filter 742 is an optical tunable filter. The filter tuning circuitry 730 is configured to adjust a filter characteristic of the tunable filter 742 based on the monitored wavelength such that a passband of the tunable filter 742 matches the shifted wavelength value (e.g., the second wavelength value). Filter characteristics of tunable filter 742 include, for example, the center wavelength, the bandwidth (e.g., full width half maximum—FWHM), blocking range, slope, optical density, etc. In some embodiments, the tunable filter 742 is configured to filter out at least some radiation having wavelengths different from the second wavelength value. Such radiation may comprise background radiation. In this way, the filter tuning circuitry 730 can adjust one or more characteristics of the tunable filter 742 such that it "follows" the wavelength of the light signals, thereby providing a relatively narrow bandpass filter to block more background radiation from passing filter 742 and in turn increase the signal-to-noise ratio. For example, the bandwidth of a tunable narrow bandpass filter can be narrower than 10 nm. In some embodiments, the tunable filter 742 includes at least one of a band-pass filter, a high-pass filter, or a low-pass filter. Embodiments of the tunable filter 742 are described in more detail below.

As shown in FIG. 7, in addition to tunable filter 742, the receiving system further comprises one or more optics including optics 740 and 744. In some embodiments, at least one optic of the one or more optics is configured to converge or focus the return light signals to pass the tunable filter 742. As a result, the return light signals are non-collimated when passing the tunable filter 742. Therefore, the receiving system can collect more return light signals while keeping the size of tunable filter small. In some embodiments, the receiving system may include a first optics 740 and a second optics 744. The tunable filter 742 is positioned between the first and second optics 740 and 744. In some embodiments, the first optic 740 is a collection lens (e.g., a single plano-convex lens or a lens group) configured to collect as much return light signals as possible from the FoV and focus the collected return light signals onto the detector 750. The tunable filter 742 can be placed close to the detector 750, where the return beam size is much smaller than the beam size before collection lens. As a result, the tunable filter 742 can also have a very small size, thereby reducing manufacturing costs and achieving a compact design of the LiDAR system 700. A compact LiDAR system is typically easier to be mounted to a vehicle. In some embodiments, the second optics 744 can be a multi-lens assembly or a convex lens. Detector 750 can be a light detector that is the same or similar to that included in optical receiver and light detector 330 described above. Detector 750 detects the return light signals passing through tunable filter 742 and optionally further processed by optics 744 and converts the optical signals to electrical signals.

Figure 8:
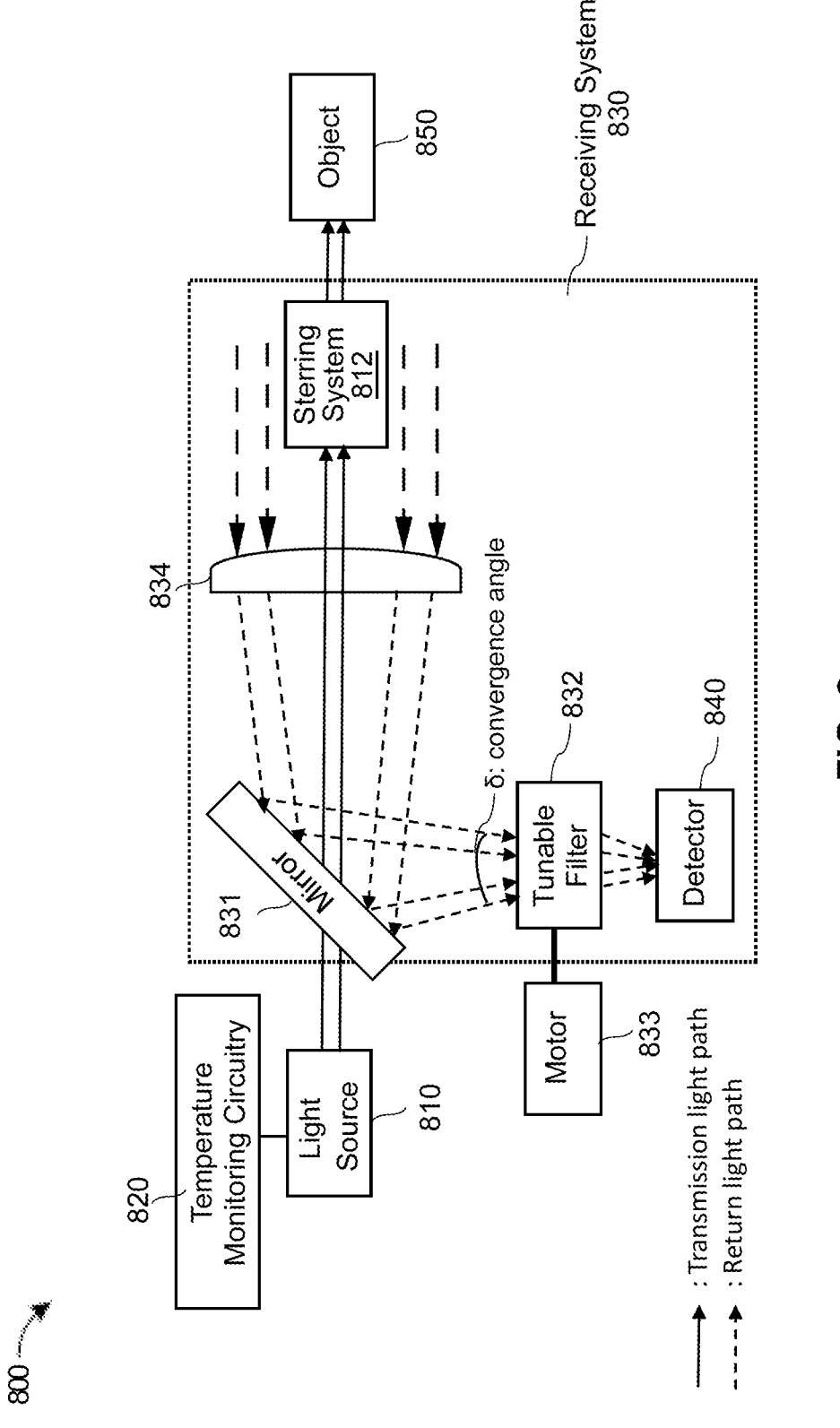
FIG. 8 illustrates an example LiDAR system using temperature monitoring circuitry and a tunable filter to receive return light signals in the LiDAR system, according to an embodiment.

FIG. 8 illustrates an example LiDAR system 800 including temperature monitoring circuitry 820 and a tunable filter 832 configured to tune return light signals according to an embodiment. The LiDAR system 800 includes a light source 810 providing light signals, a signal steering system 812, a receiving system 830, and a detector 840. Light source 810 and signal steering system 812 may be the same as or similar to light source 310 and steering mechanism 340, respectively. Detector 840 is the same as or similar to the light detector of optical receiver and light detector 330 described above. As shown in FIG. 8, the signal steering system 812 is configured to direct the light signals provided by light source 810 to illuminate an object 850 disposed in an FoV, thereby forming transmission light signals. The transmission light signals may be reflected or scattered by one or more objects (e.g., object 850) in the FoV to form return light signals. The return light signals are received by receiving system 830. In some embodiments, the signal steering system 812 can be a polygon mirror. In the receiving system 830, the return light signals are received by the polygon mirror, which is configured to direct the return light signals to other optics. This is described in detail further below with reference to FIGS. 9A-9C.

Similar to those described above, temperature fluctuations may have a significant effect on wavelength shifts of the light signals provided by light source 810. As shown in FIG. 8, the LiDAR system 800 further comprises temperature monitoring circuitry 820 positioned in the transmission light path and configured to monitor a temperature shift of the light source 810. The monitored temperature shift corresponds to a wavelength shift of the light signals (e.g., shift from a first wavelength value to a second wavelength value). Temperature monitoring circuitry 820 can be the same or similar to circuitry 720 described above.

As shown in FIG. 8, the LiDAR system 800 comprises a mirror 831 configured to separate the transmission light path and the return light path. In some embodiments, the mirror 831 is also referred to as a beam-combiner mirror. For example, the mirror 831 comprises an anti-reflection coating at a central portion of the mirror 831 for enabling the transmission light signals to pass through. The mirror 831 may further comprise a high-reflection coating on a surrounding area of the mirror 831 to redirect the return light signals to a direction of the tunable filter 832 and the detector 840.

As shown in FIG. 8, the tunable filter 832 is disposed in the receiving system 830 configured to receive return light signals. The return light signals typically have a same wavelength range as the transmission light signals. Thus, the return light signals may shift if the wavelength of the transmission light signals shifts. To compensate the wavelength shift of the light signals from a first wavelength value to a second wavelength value, the tunable filter 832 is disposed in the receiving system 830 to filter out at least some radiation having wavelengths different from the second wavelength value. In some embodiments, the at least some radiation comprises background radiation such as background sun noise. In some embodiments, similar to the tunable filter 742 in the LiDAR system 700, the tunable filter 832 is an optical tunable filter. In some embodiments, the tunable filter 832 includes at least one of a band-pass filter, a high-pass filter, or a low-pass filter. In some embodiments, the tunable filter 832 comprises an interference filter. Embodiments of the tunable filter 832 are described in more detail below.

As shown in FIG. 8, the LiDAR system 800 further comprises a motor 833 configured to rotate the tunable filter 832 by an angle based on the temperature shift such that a passband of the tunable filter 832 matches the second wavelength value. The rotation of the tunable filter 832 may change the angle-of-incidence (AOI) of the return light signals with respect to the tunable filter 832. The AOI of the return light signals refers to the angle between the direction of the light signals and the normal direction of the tunable filter 832. A center wavelength of the tunable filter 832 relates to the AOI of the return light signals. The center wavelength of the tunable filter 832 can be estimated using the follow approximate equation:

$$\lambda_\theta = \lambda_0 \sqrt{1 - \left(\frac{n_0}{n_{eff}} \sin\theta\right)^2} \qquad (1)$$

Wherein $\theta$ is the AOI; $\lambda_\theta$ is wavelength corresponding to the feature of interest (e.g., the tunable filter 742 or the tunable filter 832) at incident angle $\theta$; $\lambda_0$ is wavelength corresponding to the feature of interest at normal incidence; no is refractive index of incident medium; $n_{eff}$ is effective refractive index of the optical filter. Therefore, the wavelength of the tunable filter 832 can be tuned to match the second wavelength value. Similar to the tunable filter 832, this mechanism can also be used to tune the center wavelength of tunable filter 742 to compensate wavelength shifts of the return light signals in the LiDAR system 700. For instance, when the tunable filter 832 rotates by a small angle, the wavelength shift can be in a quadratic relationship with the AOI.

In some embodiments, the motor 833 can be a stepper motor or a DC motor. In some embodiments, a rotation resolution of the motor 833 is in the range of 0.1 to 10 degrees. In some embodiments, the motor 833 comprises a controller configured to determine the angle to which the tunable filter 832 is to be rotated. The determination is based on a calibration between the temperature shift of the light source 810 and a corresponding wavelength shift of the light signals. The determination is also based on a correlation between a plurality of wavelengths and a plurality of rotation angles of the tunable filter 832. For instance, during the calibration, a rotation angle having certain degrees (e.g., 5 degrees) is applied to the tunable filter 832. At a certain temperature (e.g., heatsink temperature of 25 degrees centigrade), the transmission spectra of the tunable filter 832 are measured for different rotation angles of the tunable filter 832. Therefore, the correlation between a plurality of wavelengths and a plurality of rotation angles of the tunable filter 832 are obtained. Further, a heatsink temperature shift of certain degrees (e.g., 10 degrees) is applied to the light source 810. The wavelength shifts of the transmission light signals are measured for different temperature shifts, so that the correlation between center wavelengths of the transmission light signals and the heatsink temperature of the light source 810 are obtained. In this way, by rotating the tunable filter 832 to compensate for the wavelength shifts caused by light source temperature shifts, there is no need for a filter with a large bandwidth to accommodate light source shifts due to wide temperature fluctuations. Therefore, the tunable filter 832 used in the LiDAR system 800 can comprise a filter with a narrower bandwidth (for example, a bandwidth narrower than 10 nm), thereby reducing the amount of background radiation passing filter 832 and improving the signal-to-noise ratio.

In some embodiments, the motor 833 is configured to rotate the tunable filter 832 if a monitored temperature shift of the light source 810 is greater than a threshold temperature shift. For example, the threshold temperature shift can be from 3 to 5° C. Thus, if the monitored temperature shift is determined (e.g., by the motor controller or another controller) to be greater than 3-5° C., the motor 833 can be triggered to rotate the tunable filter 832. The degree of rotation of the tunable filter 832 depends on the degree of temperature shift. In some embodiments, a maximum rotation angle of the tunable filter 832 accommodates the maximum range of the temperature shift of the light source 810. In one embodiment, a rotation angle of 30 degrees of the tunable filter 832 accommodates at least one of a maximum range of the temperature shift of the light source 810 or a maximum range of the wavelength shift of the light signals. For example, if the LiDAR system 800 is mounted to a vehicle, a maximum range of the temperature shift of the light source 810 can be from −40 to 105° C. It can be determined that a maximum rotation angle of 30 degrees is sufficient to accommodate such a temperature shift range.

As shown in FIG. 8, to collect more light signals scattered or reflected from an object 850 to further increase the signal-to-noise ratio, the receiving system 830 comprises one or more optics configured to converge the return light signals to pass the tunable filter 832. In some embodiments, the return light signals are received by a collection lens 834 (e.g., a single plano-convex lens or a lens group), which is configured to collect as much return light signals as possible from the FoV and focus the collected return light signals to detector 840. As a result, the return light signals converges when they are directed to mirror 831, which in turn redirects the converged return light signals to the tunable filter 832. There is a convergence angle $\delta$ for the return light signals passing the tunable filter 832 and reaching the detector 840. In some embodiments, the collection lens 834 comprises a large focal length. As a result, the convergence angle $\delta$ can be small for the return light signals passing the tunable filter 832 and reaching the detector 840, allowing the bandwidth of the tunable filter 832 to be kept small. Meanwhile, the convergence of the return light signals when passing through the tunable filter 832 enables the tunable filter 832 to have small dimensions. As shown in FIG. 8, in one example, as described above, the mirror 831 is a flat mirror or planar mirror, and can be configured to separate the transmission and receiving light paths (e.g., by using anti-reflection coating). In other embodiments, the receiving system 830 comprises a concave mirror configured to separate the transmission light path and the return light path. Moreover, the concave mirror can focus the return light signals to render the tunable filter 832 to have small dimensions. This is described in more detail further below with reference to FIG. 9B. The small dimensions of tunable filter 832 can render the receiving system 830 compact, thereby reducing manufacturing costs and achieving a compact design of the LiDAR system 800. A compact LiDAR system is typically easier to be mounted to a vehicle.

In some embodiments, the tunable filter 832 comprises a rotatable frame and a filter attached to the rotatable frame. When the rotatable frame is rotated by the motor 833 to an angle, the filter attached to the rotatable frame can move together with the rotatable frame and tune the AOI of the return light signals to filter out at least some radiation having wavelengths different from the second wavelength value (e.g., the current wavelength value of the return light signals). In some embodiments, the attachment of the filter to the rotatable frame can include using adhesive materials or mounting mechanisms. Therefore, the filter in the tunable filter 832 is replaceable and can be easily changed to different types to achieve a specific function, thereby reducing costs of manufacturing and maintenance.

In some embodiments, during a rotation of the tunable filter 832, the return light signals passing through tunable filter 832 may have a lateral position shift (e.g., focal spot shift). The lateral position shift (e.g., focal spot shift) refers to the shift of the focal spot of the filtered light signals on detector 840. This lateral position shift may not be desirable because it may cause the loss of detection by detector 840. And thus it may need to be minimized. A small thickness of the tunable filter 832 that is positioned in the receiving system can reduce the effect of lateral position shift. For example, the effect of lateral position shift can be insignificant, if tunable filter 832 has a thickness of 0.3 mm or less.

Figure 9A:
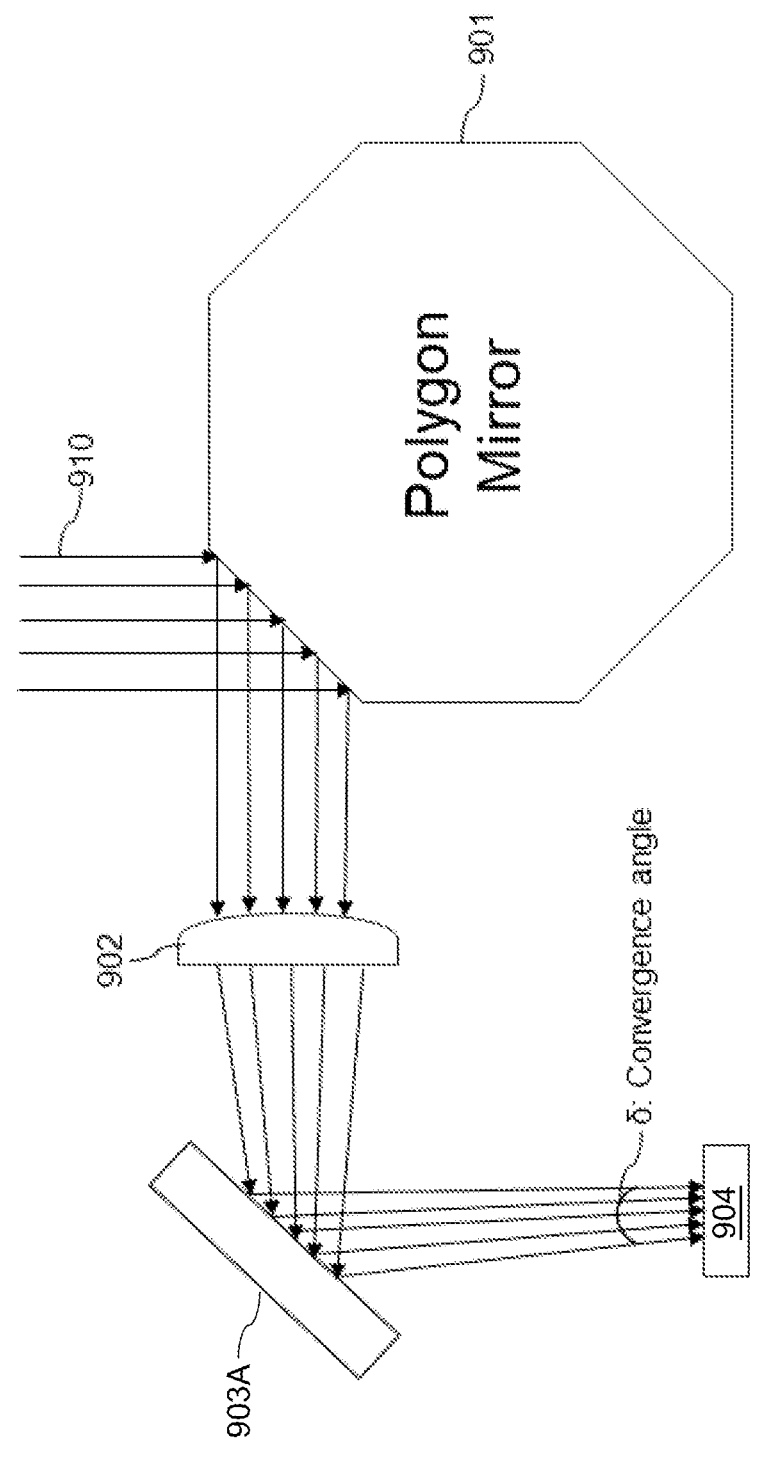
FIG. 9A illustrates an example of a receiving system in a LiDAR system, according to an embodiment.
Figure 9B:
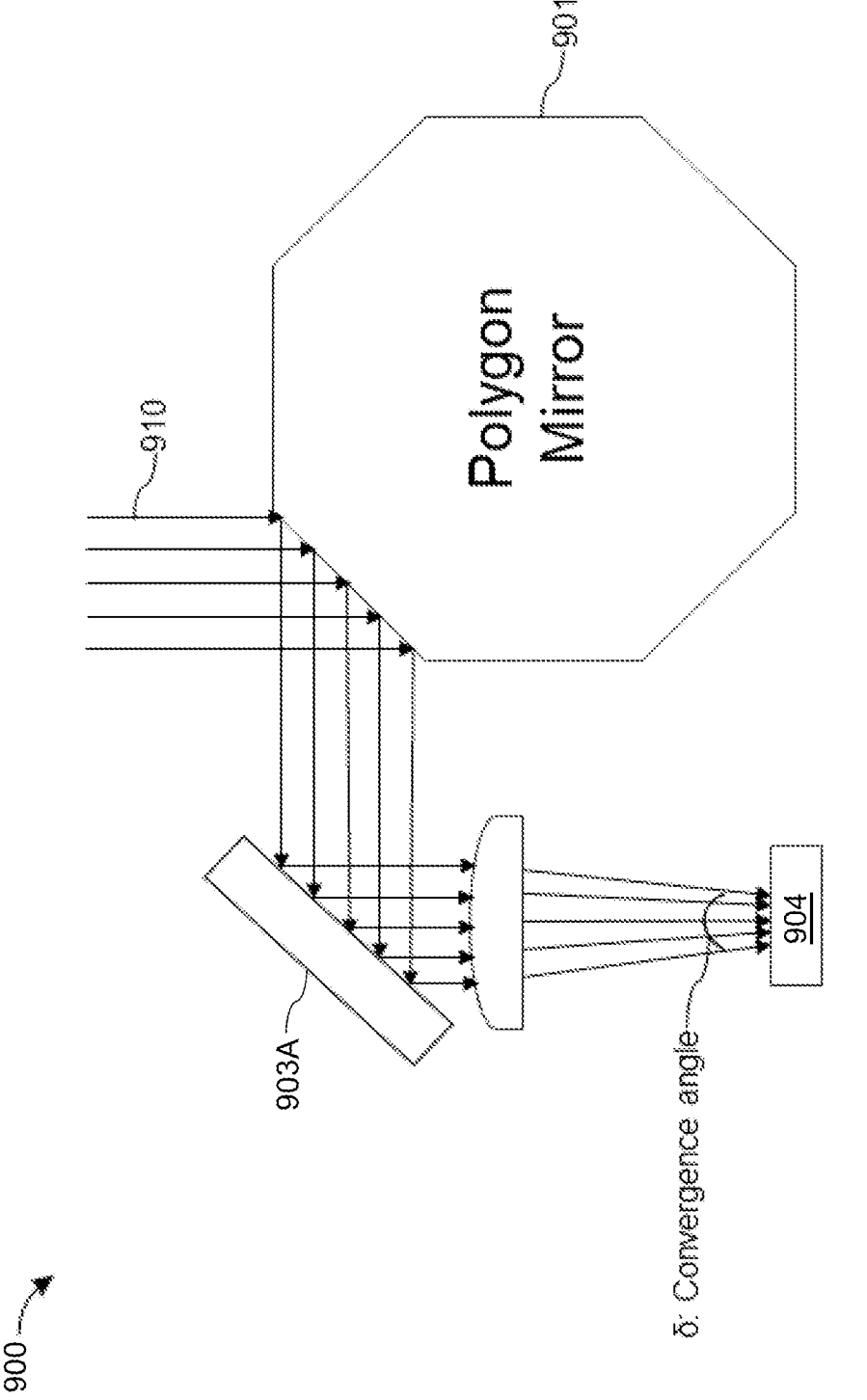
FIG. 9B illustrates another example of a receiving system in a LiDAR system, according to an embodiment.
Figure 9C:
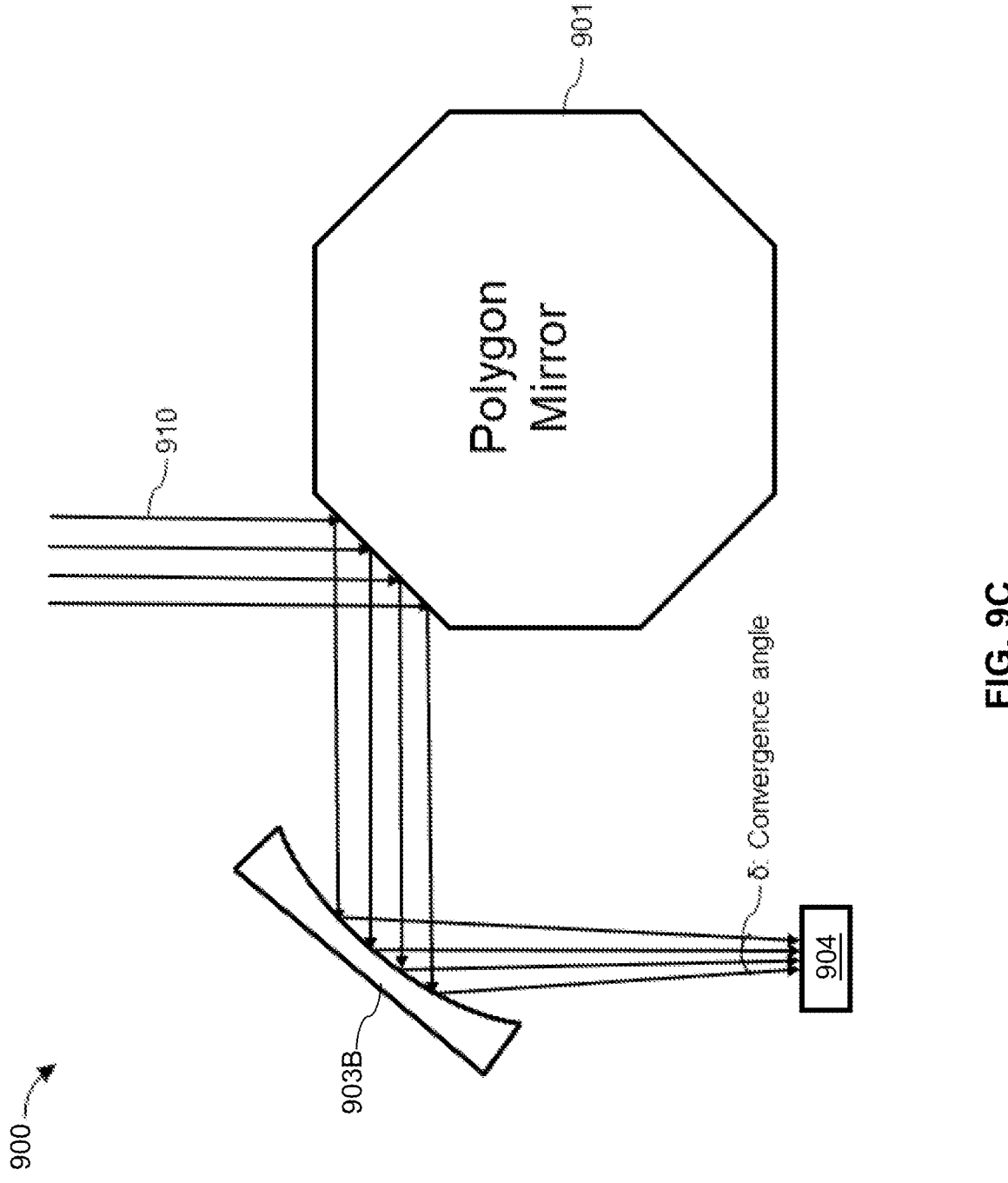
FIG. 9C illustrates another example of a receiving system in a LiDAR system, according to an embodiment.

FIGS. 9A-9C illustrate examples of a receiving system 900 in a LiDAR system, according to some embodiments. Similar to the receiving system 830 in LiDAR system 800, transmission light signals may be reflected or scattered by one or more objects (e.g., object 850) in the FoV to form return light signals 910. The return light signals 910 are received by receiving system 900. In the receiving system 900, return light signals 910 are received by a polygon mirror 901, which is configured to direct the return light signals 910 to other optics. The receiving system 900 further comprises one or more optics configured to converge the return light signals 910. As shown in FIGS. 9A and 9B, the receiving system 900 comprises a collection lens 902 configured to focus the return light signals 910. In one embodiment as shown in FIG. 9A, the return light signals 910 directed by the polygon mirror 901 can be first received by the collection lens 902, which focuses the received returned light signals 910. The focused return light signals 910 are received by a mirror 903A configured to reflect the return light signals 910 to a tunable filter 904. In one embodiment as shown in FIG. 9B, the return light signals 910 directed by the polygon mirror 901 are first received by the mirror 903A, then received by the collection lens 902 to focus the return light signals 910. A motor is configured to rotate the tunable filter 904 to a certain angular position. The degrees of the rotation of the tunable filter 904 depend on the degree of temperature shift, similar to those described above. Similar to the mirror 831 of receiving system 830 shown in FIG. 8, the mirror 903A can be a flat mirror configured to separate transmission light path and return light path. In some embodiments, the mirror 903A can be a beam-combiner mirror. For example, the mirror 903A comprises an anti-reflection coating at a central portion of the mirror 903A for transmission light signals to pass through. The mirror 903A may further comprise a high-reflection coating on a surrounding area of the mirror 903A to redirect (e.g. reflect) the return light signals to a direction of the tunable filter 904.

FIG. 9C illustrates another example of the receiving system 900 in a LiDAR system, according to some embodiments. As shown in FIG. 9C, the polygon mirror 901 is configured to direct return light signals 910 to other optics in the receiving system 900. In some embodiments, the other optics of the receiving system 900 further comprises a concave mirror 903B configured to reflect and focus the return light signals 910 to a tunable filter 904. A motor is configured to rotate the tunable filter 904 to a certain angular position. The degrees of the rotation of the tunable filter 904 depend on the degree of temperature shift, similar to those described above. In some embodiments, the concave mirror 903B is configured to separate transmission light path and return light path. In some embodiments, the concave mirror 903B can be a beam-combiner mirror. In some embodiments, the concave mirror 903B comprises an anti-reflection coating at a central portion of the concave mirror 903B for transmission light signals to pass through. The concave mirror 903B may further comprise a high-reflection coating on a surrounding area of the concave mirror 903B to redirect the return light signals to a direction of the tunable filter 904.

As shown in FIGS. 9A and 9B, the return light signals 910 converge when passing the tunable filter 904, and there is a convergence angle δ for the return light signals 910 passing the tunable filter 904. The convergence of the return light signals 910 when passing through the tunable filter 904 enables the tunable filter 904 to have small dimensions. This in turn renders the receiving system 900 compact, thereby reducing manufacturing costs and achieving a compact design for a LiDAR system. A compact LiDAR system is typically easier to be mounted to a vehicle.

Figure 10:
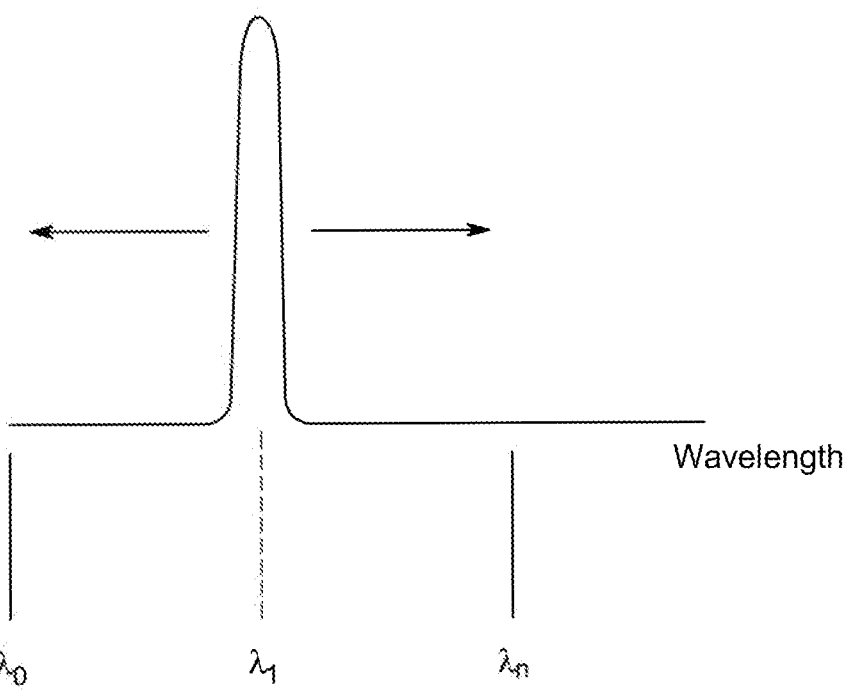
FIG. 10 is a graph illustrating a wavelength distribution of a light source centered on a frequency according to an embodiment.

FIG. 10 shows a graph illustrating a wavelength distribution of light signals provided by a light source. The wavelength distribution may be centered on a frequency according to an embodiment. As shown in FIG. 10, the wavelength distribution of the light signals is centered on a wavelength corresponding to an equivalent wavelength of $\lambda_1$. However, due to environmental changes, such as temperature fluctuations, the wavelength of the light signals can shift between $\lambda_0$ and $\lambda_n$. Thus, there is a correlation between the temperature fluctuation and the wavelength shift. For example, a temperature shift toward a high temperature value may cause the wavelength of the light signals to shift to a longer wavelength, and vice versa. This correlation can form a basis for performing a calibration by applying a certain range of temperature shifts (e.g., a range of 10 degrees) to the light source, and measuring the wavelength shifts of the transmission light signals at different temperatures.

Figure 11:
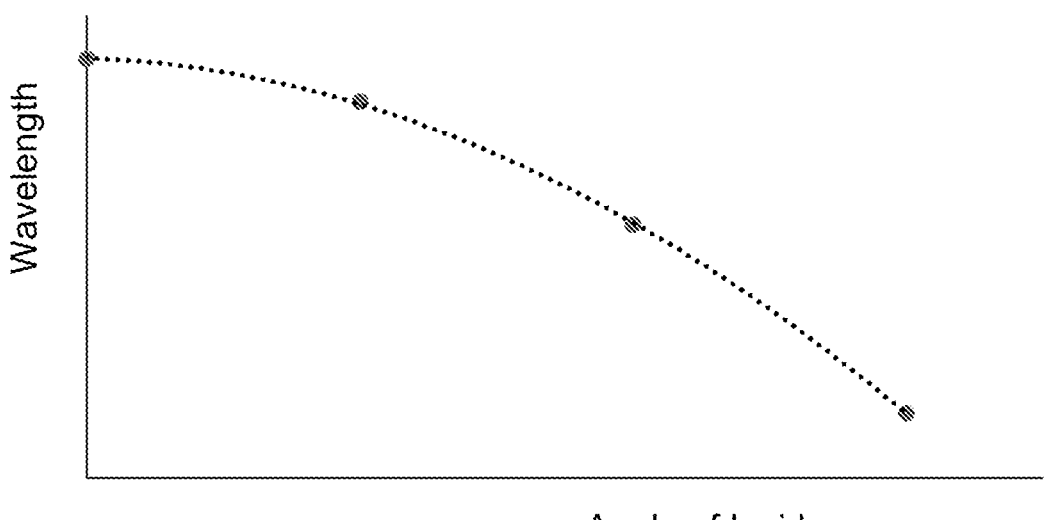
FIG. 11 is a graph illustrating a relation between a wavelength of return light signals and an angle of incidence of the return light signals according to an embodiment.

FIG. 11 shows a graph illustrating a relation between a wavelength of light signals provided by a light source and an optimal angle of incidence of return light signals passing through the bandpass filter according to an embodiment. As shown in FIG. 11, when a wavelength λ of the light signals changes, the optimal angle of incidence (AOI) of the return light signals also needs to be changed such that the filter passband can match the wavelength shift. The AOI of the return light signals refers to the angle between the direction of the light signals and the normal direction of the filter surface. FIG. 11 illustrates that, for example, when the wavelength of the light signals increases (e.g., due to increases of the temperature), the AOI of the return light signals with respect to the tunable filter needs to be decreased to change the passband of the filter. As shown in FIG. 11, the relation between the wavelength and the AOI may not be linear. The wavelength of the light source often shifts in a linear relationship with the temperature shifts. For example, the wavelength of light signals provided by a typical 905 nm edge-emitting diode laser shifts about 0.3 nm per degree centigrade due to the temperature shifts. Therefore, there is a correlation between the plurality of wavelengths and the plurality of angles of incidence of the return light signals. Therefore, based on the correlation between the wavelengths and the angles of incidence of the return light signals, a tunable filter can be tuned to a correlated angle of incidence of the return light signals passing the tunable filter to compensate for a wavelength shift of light signals. While FIG. 11 illustrates one type of relation between the wavelength of light signals and the AOI, it is understood that it may have other types of relations depending on the type of laser or filter.

Figure 12:
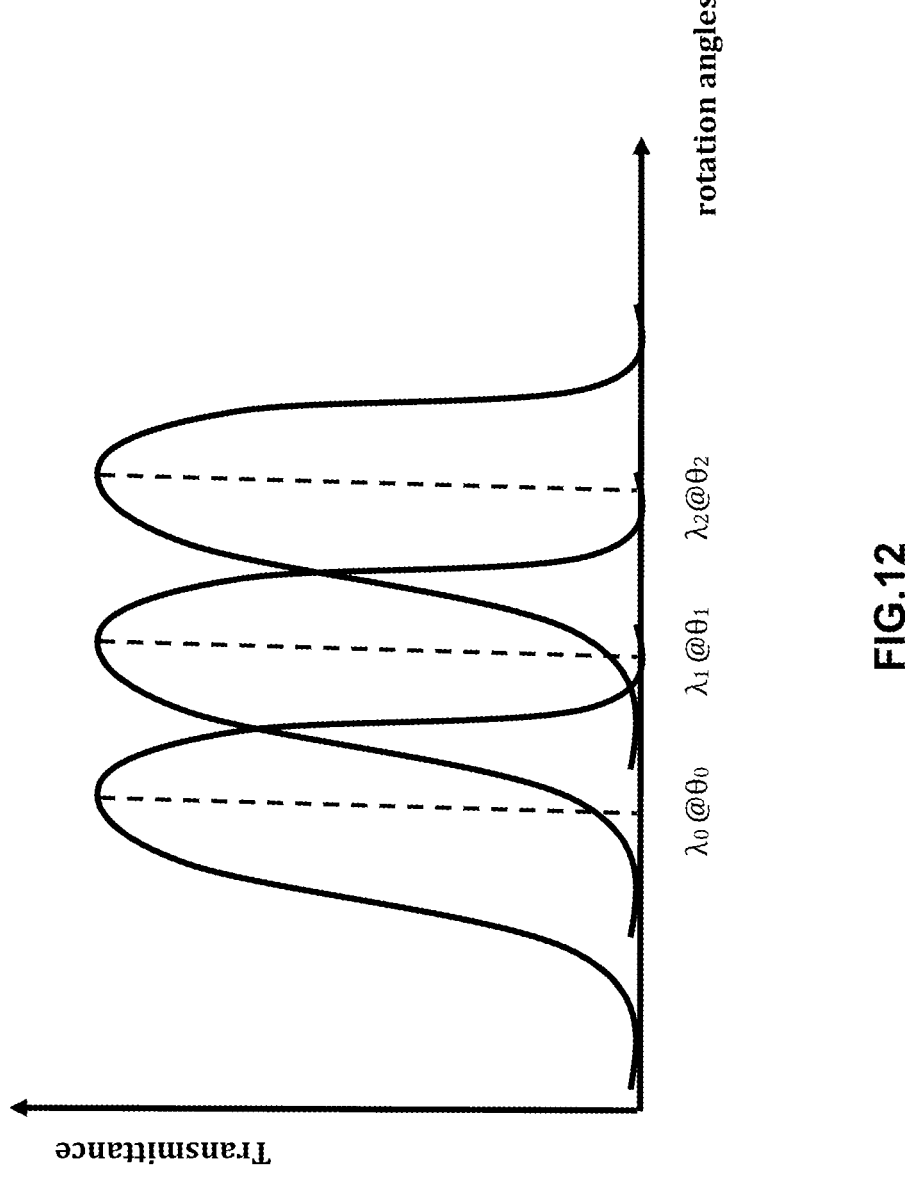
FIG. 12 illustrates a correlation of transmission spectra of a tunable filter and rotation angles of the tunable filter according to an embodiment.

As described above, the AOI refers to the angle between the incident direction of the light signals and the normal direction of the filter surface. The AOI can be changed when the tunable filter is rotated. FIG. 12 illustrates a correlation of transmission spectra of a tunable filter and rotation angles of the tunable filter. As shown in FIG. 12, as the wavelength of the return light signal shifts to $\lambda_0$, $\lambda_1$, and $\lambda_2$ due to temperature fluctuations, the passband of the tunable filter changes to compensate the wavelength shifts by rotating the tunable filter (or the mirror) to an angle of $\theta_0$, $\theta_1$, and $\theta_2$, respectively. Therefore, by rotating the tunable filter, the center wavelength of the passband of the tunable filter can be shifted to match the shifted wavelength of the return light signals (e.g., due to temperature shifts). Further, a spectral shape of the return light signals passing the tunable filter can be designed to remain substantially the same for a range of AOI adjustment. In some embodiments, the range of AOI adjustment is within about 30 degrees. For example, a full width at half maximum (FWHM) of the return light signals passing through the tunable filter can remain substantially the same when the tunable filter is rotated by $\theta_1$, $\theta_2$, and $\theta_3$.

Figure 13:
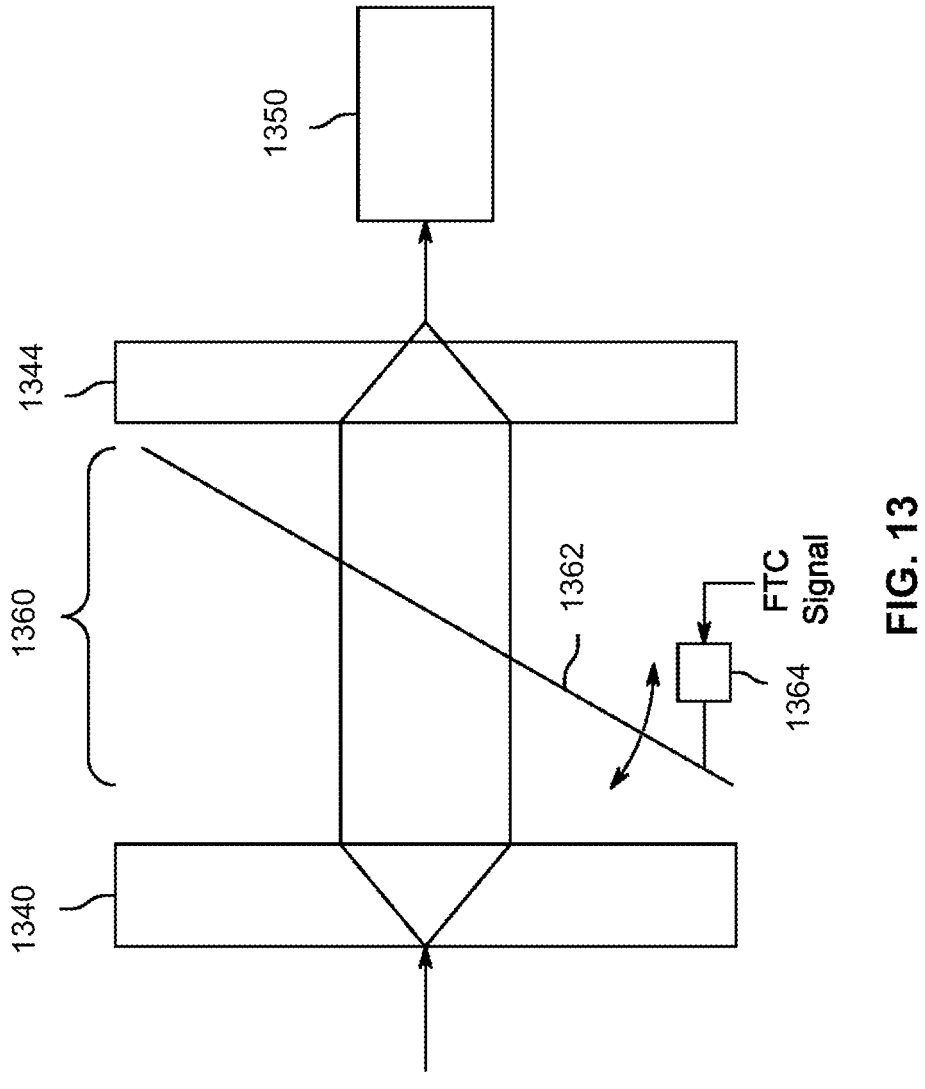
FIG. 13 illustrates an example of a return path in a LiDAR system using a tunable filter according to some embodiments.

FIG. 13 shows an example of a return path in a LiDAR receiving system (e.g., system 830 or 900) using a tunable filter according to an embodiment. The receiving system comprises a first optic 1340 and a second optic 1344, a tunable filter 1360, and a detector 1350. First optic 1340 and second optic 1344 can be the same or similar to optics 740 and 744, respectively, as described above. The tunable filter 1360 can include an interference filter 1362 and a movement member 1364. The movement member 1364 can move the interference filter 1362 in the directions of the arrows (as shown). For example, the movement member 1364 may be a motor, an actuator, a screw-drive, a pulley drive, a track drive, or any other suitable drive system. Moving the interference filter 1362 changes the AOI of return light signals passing the tunable filter 1360. The AOI of the return light signals refers to the angle between the direction of the light signals and the normal direction of the tunable filter 1360. A center wavelength of the tunable filter 1360 relates to the AOI of the return light signals can be calculated using the equation (1) described above. Therefore, the tunable filter 1360 can be tuned to compensate for wavelength shifts monitored by wavelength monitoring circuitry. In some embodiments, movement member 1364 may receive signals from filter tuning circuitry (FTC) (e.g., filter tuning circuitry 730 in FIG. 7) to position filter 1362 in the appropriate position to "follow" the wavelength of light being emitted by a light source (e.g., light source 710 or 810 in FIGS. 7 and 8). That is, the FTC signals instruct movement member 1364 to position filter 1362 such that its angle of incidence corresponds to the wavelength monitored by the wavelength monitoring circuitry.

Figure 14A:
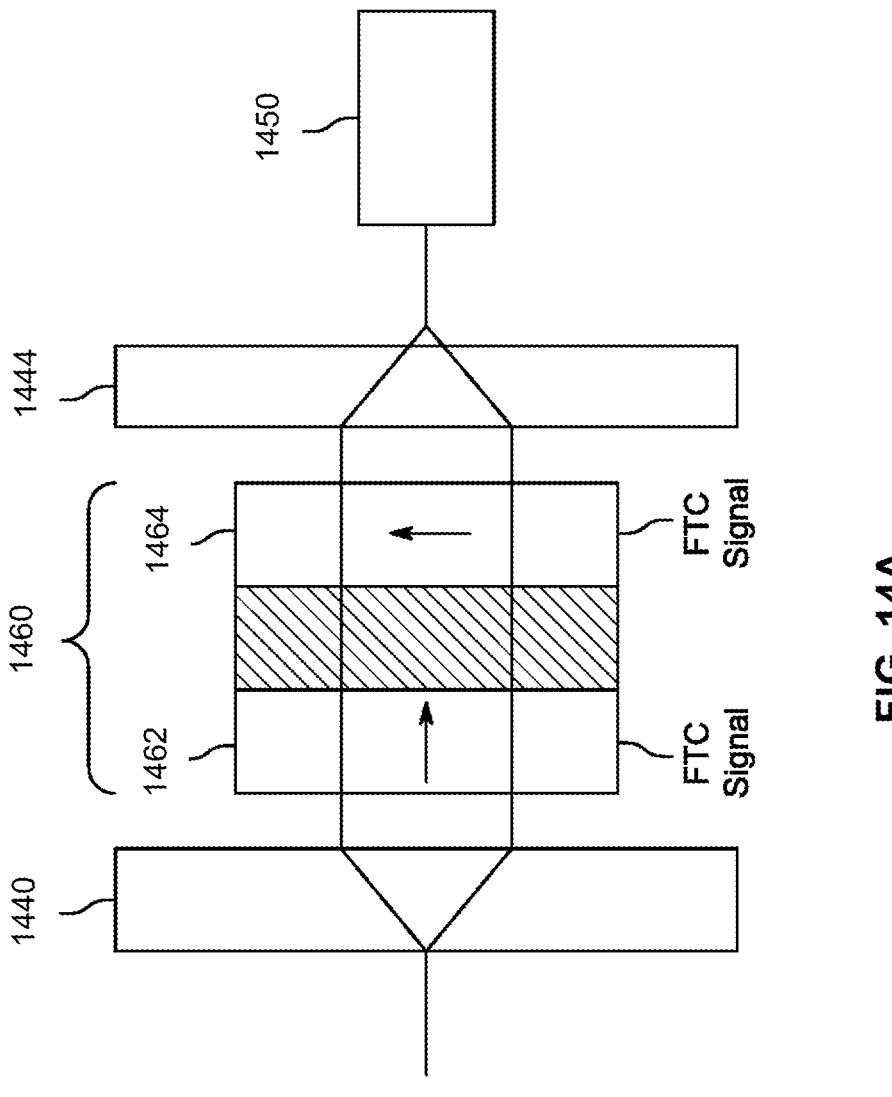
FIG. 14A illustrates an example of a tunable filter in a LiDAR system according to some embodiments.

FIG. 14A shows an example of a tunable filter in a LiDAR receiving system according to an embodiment. As shown in FIG. 14, the LiDAR receiving system comprises a first optic 1440 and a second optic 1444, a tunable filter 1460, and a detector 1450. First optic 1440 and second optic 1444 can be the same or similar to optics 740 and 744, respectively, as described above. The tunable filter 1460 can include polarizers 1462 and 1464 with liquid crystal in between. By using these polarizers, the tunable filter 1460 is configured to tune an amplitude of return light signals passing through the tunable filter 1460 and thus control the amplitude of return light signals reaching the detector 1450. In some embodiments, if the liquid crystal is not energized, the amplitude of return light signals passing through the tunable filter 1460 is proportional to a cosine value of an angular difference a between the polarization direction of the polarizer 1462 and the polarization direction of the polarizer 1464. For example, the polarization directions of the polarizers 1462 and 1464 can be placed perpendicular to each other (e.g., the angular difference a between of the polarizer 1462 and the polarizer 1464 is 90 degrees). For example, the polarization direction of the polarizer 1462 may be horizontal and the polarization direction of the polarizer 1464 may be vertical. Therefore, without any FTC signals applied to the tunable filter 1460, the amplitude of return light signals is approximately zero after passing through the tunable filter 1460, and there are no light signals detected at the detector 1450. The tunable filter 1460 further comprises long molecules in between the polarizers 1462 and 1464, such as the liquid crystal, that are aligned in one direction. The tunable filter 1460 may receive FTC signals to change a birefringence of the liquid crystal. For example, the FTC signals can be used to apply voltages to the liquid crystal to adjust a direction of liquid crystal alignment and in turn to change a polarization of the liquid crystal in between the polarizers 1462 and 1464. As a result, depending on the polarization of the liquid crystal, a proper amplitude of return light signals passing through the tunable filter 1460 can be obtained.

Figure 14B:
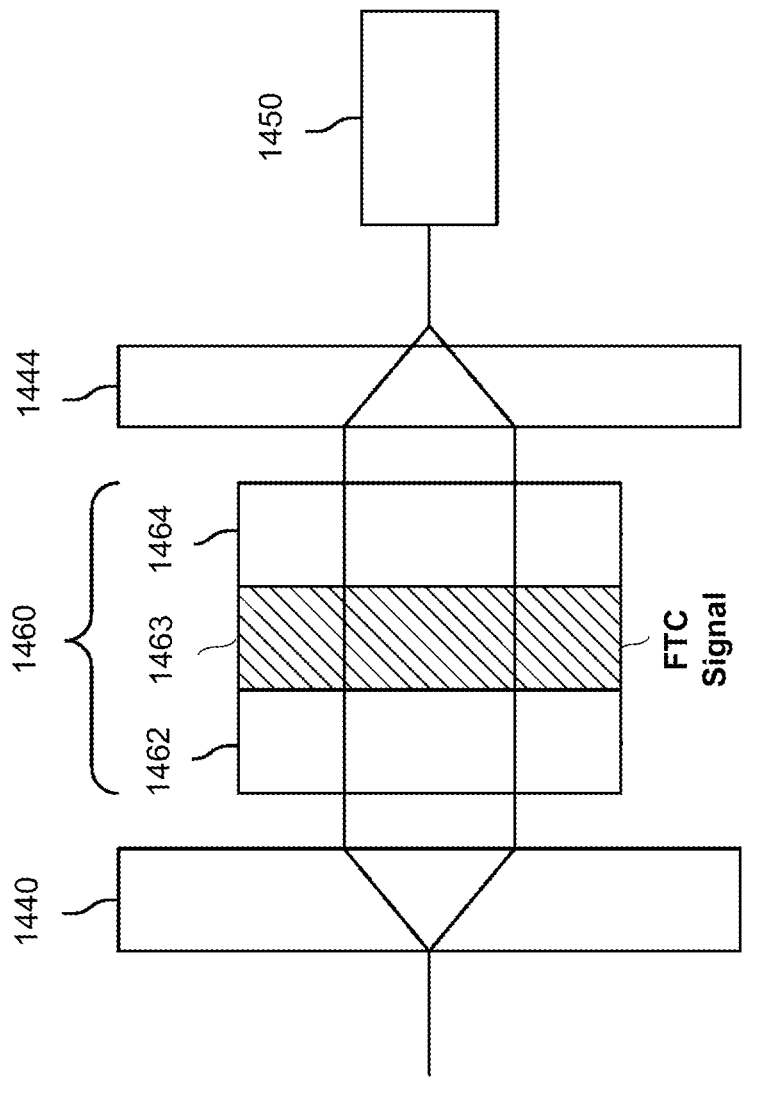
FIG. 14B illustrates another example of a tunable filter in a LiDAR system according to some embodiments.

FIG. 14B shows another example of a tunable filter in LiDAR receiving system according to an embodiment. As shown in FIG. 14B, a tunable filter 1460 comprises high-reflection coatings on a front surface 1462 and a back surface 1464 of the tunable filter 1460. The tunable filter further comprises a substrate material 1463 disposed in between the front and back surfaces 1462 and 1464. In some examples, the substrate material 1463 for the tunable filter 1460 includes air, liquid crystal, piezoelectric material, fused silica, silicon, or the like. In some embodiments, the tunable filter 1460 may receive FTC signals to adjust a thickness of the substrate material 1463 or a refractive index of the substrate material 1463. As a result, a wavelength of the return light signals is turned to match the wavelength of light being emitted by a light source (e.g., light source 710 or 810 in FIGS. 7 and 8).

FIG. 15 shows a flowchart illustrating an example method 1500 for using a LiDAR system according to some embodiments. In step 1510, wavelength monitoring circuitry monitors wavelength of light signals provided by a light source to a light steering system of the LiDAR system. The signal steering system scans the light signals to locations within a field-of-view (FoV) of the LiDAR system. The transmission light signals may be reflected or scattered by one or more objects in the FoV to form return light signals. The return light signals are received by a receiving system. The monitored wavelength of the light signals shifts from a first wavelength value to a second wavelength value. The wavelength monitoring circuitry determines the monitored wavelength of the light signals. In some embodiments, the wavelength monitoring circuitry includes circuitry for monitoring at least one of environmental factors leading to wavelength shifts. Such factors include, for example, temperature, humidity, radiation, and interferences.

In step 1520, filter tuning circuitry adjusts a filter characteristic of a tunable filter based on the monitored wavelength such that a passband of the tunable filter matches the second wavelength value. The tunable filter is disposed in the receiving system configured to receive return light signals. The tunable filter is configured to filter out at least some radiation having wavelengths different from the second wavelength value. The at least some radiation comprises background radiation. In some embodiments, the tunable filter comprises an interference filter. In some embodiments, the tunable filter includes at least one of a band-pass filter, a high-pass filter, or a low-pass filter.

In method 1500, the receiving system further comprises one or more optics. In some embodiments, the one or more optics are configured to converge the return light signals to pass the tunable filter. The return light signals are non-collimated when passing the tunable filter. In some embodiments, the receiving system may include a first optic and a second optic. The tunable filter is positioned between the first and second optics. In some embodiments, the first optic comprises a collection lens.

FIG. 16 shows a flowchart illustrating another example method 1600 for using a LiDAR system according to some embodiments. In step 1610, temperature monitoring circuitry monitors a temperature shift of a light source providing light signals to a light signal scanner of a LiDAR system. The temperature shift corresponds to a wavelength shift of the light signals from a first wavelength value to a second wavelength value. The LiDAR system further comprises a signal steering system configured to direct the light signals to a FoV. The light signals may be reflected or scattered by one or more objects in the FoV to form return light signals. The return light signals are received by a receiving system. The receiving system comprises one or more optics. For example, the receiving system comprises a collection lens, a mirror and a tunable filter.

In step 1620, the temperature monitoring circuitry determines the monitored temperature shift corresponding to a wavelength of the light signals that shifts from a first wavelength value to a second wavelength value.

In step 1630, the tunable filter is disposed in the receiving system configured to receive return light signals. A motor rotates the tunable filter by an angle based on the monitored temperature shift such that a passband of the tunable filter matches the second wavelength value. In some embodiments, the motor can be an AC motor or a DC motor. In some embodiments, a rotation resolution of the motor is between 0.1 to 10 degrees.

In some embodiments, the receiving system comprises one or more optics configured to direct the return light signals to the tunable filter. In some embodiments, the one or more optics comprises a collection lens and a mirror. The collection lens converges the return light signals to form converged return light signals. Then the mirror reflects the converged return light signals to the tunable filter. In some embodiments, the receiving system comprises a first optic and a second optic. The tunable filter is positioned between the first and second optics. The first optic comprises a collection lens.

In some embodiments, the tunable filter comprises a filter and a rotatable frame. The motor rotates the rotatable frame of the tunable filter by an angle based on the monitored temperature shift. In some embodiments, the tunable filter is configured to filter out at least some radiation having wavelengths different from the second wavelength value. In some embodiments, the tunable filter comprises an interference filter. In some embodiments, the tunable filter includes at least one of a band-pass filter, a high-pass filter, or a low-pass filter. In some embodiments, a spectral shape of the return light signals passing the tunable filter remain substantially the same when the tunable filter is rotated by the angle.

In some embodiments, the motor comprises a controller configured to determine the angle to which the tunable filter is to be rotated. The determination is based on a calibration between the temperature shift of the light source and a corresponding wavelength shift of the light signals. The calibration is based on a correlation between a plurality of wavelengths and a plurality of rotation angles of the tunable filter.

In some embodiments, the motor is configured to rotate the tunable filter in response to a monitored temperature shift of the light source larger than a threshold temperature shift. In some embodiments, a maximum rotation angle of the tunable filter accommodates the maximum range of the temperature shift of the light source. In one embodiment, a rotation angle of 30 degrees of the tunable filter accommodates at least one of a maximum range of the temperature shift of the light source or a maximum range of the wavelength shift of the light signals. For example, if the LiDAR system is mounted to a vehicle, a maximum range of the temperature shift of the light source is from −40 to 105° C.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A light detection and ranging (LiDAR) system, comprising:
   a light source providing light signals;
   an optical scanner configured to direct the light signals to a field of view in multiple dimensions;
   temperature monitoring circuitry configured to monitor a temperature shift of the light source, the temperature shift corresponding to a wavelength shift of the light signals from a first wavelength value to a second wavelength value;
   a tunable filter disposed in a receiving system configured to receive return light signals; and
   a motor configured to rotate the tunable filter by an angle based on the temperature shift such that a passband of the tunable filter matches the second wavelength value, wherein a distance to an object located in the field of view is obtained based on the return light signals and the light signals directed to the field of view.

2. The system of claim 1, wherein the receiving system comprises at least one lens or mirror configured to converge the return light signals to pass the tunable filter.

3. The system of claim 1, wherein the receiving system comprises a mirror configured to reflect the return light signals to the tunable filter.

4. The system of claim 3, wherein the mirror is a flat mirror.

5. The system of claim 3, wherein the mirror is a concave mirror.

6. The system of claim 1, wherein the receiving system comprises a polygon mirror.

7. The system of claim 1, wherein the tunable filter comprises a filter and a rotatable frame.

8. The system of claim 1, wherein the motor comprises a controller configured to determine, based on a calibration between the temperature shift of the light source and a corresponding wavelength shift of the light signals, the angle to which the tunable filter is to be rotated.

9. The system of claim 8, wherein the calibration is based on a correlation between a plurality of wavelengths and a plurality of rotation angles of the tunable filter.

10. The system of claim 1, wherein the motor is configured to rotate the tunable filter in response to a monitored temperature shift of the light source larger than a threshold temperature shift.

11. The system of claim 10, wherein a maximum rotation angle of the tunable filter accommodates the maximum range of the temperature shift of the light signals.

12. The system of claim 1, wherein a rotation angle of 30 degrees of the tunable filter accommodates at least one of a maximum range of the temperature shift or a maximum range of the wavelength shift of the light signals.

13. The system of claim 1, wherein a rotation resolution of the motor is between 0.1 to 10 degrees.

14. The system of claim 1, wherein the tunable filter is configured to filter out at least some radiation having wavelengths different from the second wavelength value.

15. The system of claim 1, wherein the receiving system comprises a first optic and a second optic, and wherein the tunable filter is positioned between the first and second optics.

16. The system of claim 15, wherein the first optic comprises a collection lens.

17. The system of claim 1, wherein the tunable filter comprises an interference filter.

18. A method comprising:

monitoring a temperature shift of a light source providing light signals to a light signal scanner of a light ranging and detection (LiDAR) system, wherein the light signal scanner is configured to direct the light signals to a field of view in multiple dimensions, the temperature shift corresponding to a wavelength shift of the light signals from a first wavelength value to a second wavelength value;

determining that the monitored temperature shift corresponding to a wavelength of the light signals that shifts from a first wavelength value to a second wavelength value; and actuating a motor to rotate a tunable filter by an angle based on the monitored temperature shift such that a passband of the tunable filter matches the second wavelength value, wherein the tunable filter is disposed in a receiving system configured to receive return light signals, wherein a distance to an object located in the field of view is obtained based on the return light signals and the light signals directed to the field of view.

19. The method of claim 18, further comprising, directing, by the receiving system comprising one or more optics, the return light signals to the tunable filter.

20. The method of claim 18, wherein directing the return light signals to the tunable filter comprises:

converging, by a collection lens, the return light signals to form converged return light signals; and reflecting, by a mirror, the converged return light signals to the tunable filter.

21. The method of claim 18, wherein actuating a motor to rotate a tunable filter by an angle comprises rotating a rotatable frame of the tunable filter.

22. The method of claim 18, wherein a spectral shape of the return light signals passing the tunable filter remain substantially the same when the tunable filter is rotated by the angle.

23. The method of claim 18, further comprising: determining, by a controller of the motor and based on a calibration between the temperature shift of the light source and a corresponding wavelength shift of the light signals, the angle to which the tunable filter is to be rotated.

24. The method of claim 23, wherein the calibration is based on a correlation between a plurality of wavelengths and a plurality of rotation angles of the tunable filter.

25. The method of claim 18, wherein the motor is configured to rotate the tunable filter in response to a monitored temperature shift of the light source larger than a threshold temperature shift.

26. The method of claim 18, wherein a maximum rotation angle of the tunable filter accommodates the maximum range of the temperature shift of the light source.

27. A vehicle comprising a Light Detection and Ranging (LiDAR) system, the LiDAR system comprising:

a light source providing light signals;

an optical scanner configured to direct the light signals to a field of view in multiple dimensions;

temperature monitoring circuitry configured to monitor a temperature shift of the light source, the temperature shift corresponding to a wavelength shift of the light signals from a first wavelength value to a second wavelength value;

a tunable filter disposed in a receiving system configured to receive return light signals; and a motor configured to rotate the tunable filter by an angle based on the temperature shift such that a passband of the tunable filter matches the second wavelength value, wherein a distance to an object located in the field of view is obtained based on the return light signals and the light signals directed to the field of view.

* * * * *